United States Patent [19]

Keefe

[11] Patent Number: 4,638,194
[45] Date of Patent: Jan. 20, 1987

[54] COHERENT MAGNETO-CALORIC EFFECT SUPERCONDUCTIVE HEAT ENGINE PROCESS CYCLE

[76] Inventor: Peter D. Keefe, Box 259, Roseville, Mich/48066

[21] Appl. No.: 515,062
[22] Filed: Jul. 18, 1983
[51] Int. Cl.$^4$ .......................................... H02K 9/00
[52] U.S. Cl. .................................. 310/40 R; 310/52
[58] Field of Search .................................. 310/40, 52

[56] References Cited

U.S. PATENT DOCUMENTS

| | | | |
|---|---|---|---|
| 3,252,018 | 5/1966 | Drautman | 310/16 |
| 3,277,322 | 10/1966 | Berlincourt | 310/40 |
| 3,292,021 | 12/1966 | Hoag | 310/40 |
| 3,336,489 | 8/1962 | Volger | 310/40 |
| 3,402,307 | 9/1968 | Pearl | 310/10 |
| 3,443,128 | 5/1969 | Fakan | 310/10 |
| 3,560,773 | 2/1971 | McFarlane | 310/52 |

OTHER PUBLICATIONS

"A Thermodynamic Comparison Between the Magneto-Mechanically and Magneto-Calorically Induced Superconductive Phase Transitions in a Type I Superconductor Culminating in a Proposal for a New Type of Superconductive Motor", Peter D. Keefe, Master of Science Thesis, Univ. of Detroit, 1974.
"Approach to the Ideal Magnetic Circuit Concept Through Superconductivity", P. P. Cioffi, J. App. Phy., 33, 875 (1962).
"Thermodynamics of a Superconducting Energy Converter", Marvin Chester, J. App. Phy., 33, 643 (1962).
"Cooling by Adiabatic Magnetization of Superconductors", M. Yaqub, Cryogenics, Dec. 1960, 101.
"Further Calorimetric Experiments on Thallium", W. H. Keesom and J. A. Kok, Physica I, 595 (1934).
"An Experiment on the Mechanism of Superconductivity", J. G. Daunt and K. Mendelssohn, Proc. Roy. Soc., A185, 225 (1946).
"Measurements of the Latent Heat of Tin While Passing from the Superconductive to the Non-Superconductive State at Constant Temperature", W. H. Keesom and P. H. Van Laer, Physica IV, 487 (1937).
"Magnetic Hysteresis in Superconducting Colloids", A. B. Pippard, Phil. Mag., 43, 273 (1952).
"Superconducting Transitions in Tin Whiskers", O. S. Lutes, and E. Maxwell, Phy. Rev., 97, 1718 (1955).
"Direct Experimental Measurement of the Magnetic Field Dependence of the Superconducting Energy Gap of Aluminum", D. H. Douglass, Jr., Phy. Rev. Lett., 7, 14 (1961).
"Specific Heat of Superconducting Fine Particles of Tin. I. Fluctuations in Zero Magnetic Field and II. Fluctuations under Magnetic Field, Critical Field and Transition Temperature", Takefumi Tsuboi and Takao Suzuki, J. Phy., Soc. of Jap. 42, 437 (1977) and 43, 444 (1977).
"Magnetic Hysteresis in Superconducting Thin Films", Hollis L. Caswell, J. App. Phy. 36, 80 (1965).
"Kinetics of the Phase Transition in Superconductors", T. E. Faber and A. B. Pippard, Prog. Low Temp. Phy. VI, 172 (1955).
"The Magnetic Forces on Superconductores and Their Applications for Magnetic Bearings", T. A. Buchhold, Cryogenics, Jun. 1961, 203.

*Primary Examiner*—Donovan F. Duggan
*Attorney, Agent, or Firm*—Peter D. Keefe; William J. Coughlin

[57] ABSTRACT

Presented is a new type of heat engine and process cycle utilizing, through the medium of superconductivity, a singular high temperature heat reservoir as a source of motive fuel directed into a low temperature region, the net effect being to cyclically process a superconductive substance magneto-calorically in H-T space so as to convert a thermal energies input directly into an available work energies output, without any need for a pressed, externally derived temperature variation, nor low temperature reservoir, for absorption of waste heats, to accomplish same, and which process is adaptable for both the direct generation of mechanical energy or electrical energy, in either mode being called a "Keefengine". The process of such conversions of ambient heat into utilizable work being called "Thermosynthesis", and being the product of the thermodynamic cycling of an "Envelopment", consisting of any number of mutually insulated "Segments" of size "d", where $\sqrt{5\lambda(T)} < d < \xi(T)$, such size being called "coherently dimensioned", and being composed of any superconductor where $\sqrt{5\lambda(T)} < \xi(T)$. Further, output energy expectancies are on the order of 50 horse power per cubic foot, depending on design optimization.

52 Claims, 48 Drawing Figures

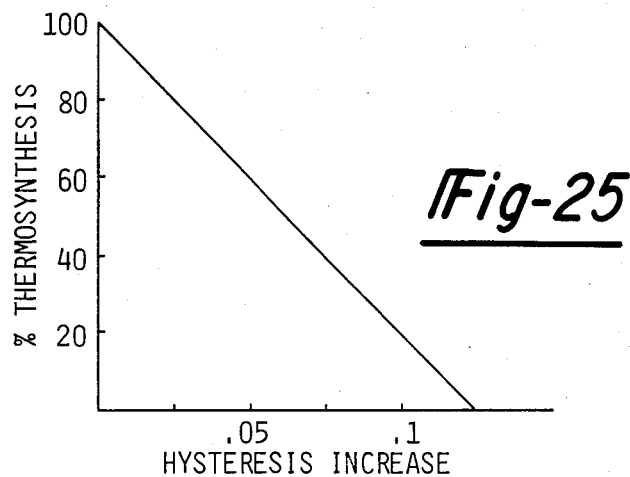
Fig-25
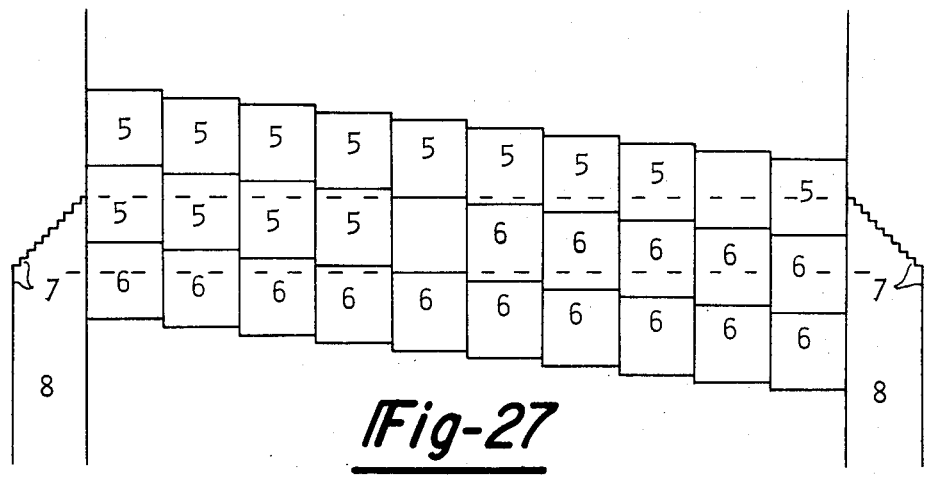
Fig-26
Fig-27
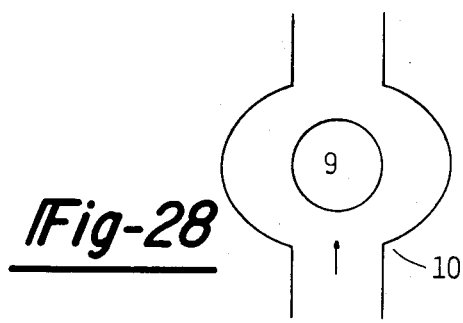
Fig-28
Fig-29

COHERENT MAGNETO-CALORIC EFFECT SUPERCONDUCTIVE HEAT ENGINE PROCESS CYCLE

BACKGROUND AND SUMMARY OF THE INVENTION

I. Introduction To The Invention

The invention herein is an outgrowth of research into the superconductive phenomenon by the Inventor since 1966, and particularly, his Master of Science Thesis of 1974 at the University of Detroit, entitled "A Thermodynamic Comparison between the Magento-Mechanically and Magneto-Calorically Induced Superconductive Phase Transitions in a Type I Superconductor Culminating in a Proposal for a New Type of Suprconductive Motor", which is hereby incorporated by reference. This thesis elucidated a cyclic process, and several embodiments, for a heat engine utilizing superconductors as the working substance. The present Invention is an entirely new approach, however, to the problem of achieving a successful closed thermodynamic cycle.

The essential drawback to any energies conversion process is the rejection of waste heat to the low temperature reservoir when above absolute zero. It is the subject of the Invention herein to fully describe a cyclic process for superconductors whereby heat may be directly converted into work, with no waste heats rejection to a low temperature region, independent of its temperature.

(a) Superconductivity, An Historical Summary

H. Kamerlingh Onnes first successfully liquified helium by attaining 4.2° K. in 1908. This achievement opened a new domain for scientific investigation: The unthinkably frigid zone just above the absolute zero of temperature. Onnes immediately recognized the vast potential his accomplishment created and decided to perform resistivity experiments at these heretofore unknown temperatures.

It was everyone's guess that electrical resistance would either cease, level off, or increase near absolute zero, either because of heat, impurity, or electronic condensation effects, respectively. Onnes decided to measure the resistive properties of mercury, to determine the nature of this electronic phenomenon, at liquid helium temperatures.

The resistance of mercury steadily declined with reduced temperature until suddenly at 4.152° K., which was remarkably close to the helium boiling point, the metal lost all resistance to electric currents.

It was quickly speculated that this perfect or superconduction of electric current was due to some new condition within the sample yielding a state of infinite conductivity. Onnes and several other investigators performed tests with spheres of lead and other "superconductive" materials leading to the result that (A) conductivity was indeed perfect and (B) any incident magnetic field was excluded or not from the interior of such a lossless sample depending on its pre-history, that is, whether the field was applied before or after the material became superconducting.

It is not with little shock that the scientific community of 1933 was jolted by the news of an experiment by W. Meissner and R. Ochsenfeld which conclusively proved that the magnetic state of a superconductive sample is independent of its pre-history. Incredibly, the applied field which was present in their mono-crystal of tin above the transition temperature was summarily and completely expelled upon reducing the temperature below its critical value, $T_c$. Therefore, the internal field is always zero while the metal is in the superconductive state.

How could such a wondrous mechanism, the so-called Meissner Effect, remain undetected for more than twenty years? (A) The previous experimenters had not been properly cautious and careful in taking readings on the fields outside their test samples. (B) Often hollow lead, etc., spheres were used in order to reduce helium refrigerant requirements, resulting in honestly mistaken measurements. (C) The theoreticians had created an entire body of experimentally and mathematically unquestionable phenomenological treatments based on the perfect conductor premise. With the foregoing in mind it is understandable how the entire scientific world was kept within the bounds of its own preconceived myth (save for a visionary few).

In the intervening years between the discovery of the Meissner Effect and the introduction of the microscopic theory in 1957, investigators sought after two rather elusive points: (A) A theory which would explain the perfect electrical conduction and Meissner Effect coupled with experimentally found limits underwhich superconductivity may occur: below a certain maximum applied magnetic field and under a particular highest ambient temperature, and (B) superconductive materials which would retin their unique properties in very high fields and temperatures.

During this period some confusion resulted because of lack of universal recognition for many years of two classes of superconductors and the distinction between various phases within each class. Eventually, experimentation proved that: (A) Type I superconductors of the soft metals had a low critical field and temperature and entered an intermediate state of alternate domains of superconductive and normal material when the geometry of the sample was other than a thin cylinder in a longitudinal mgnetic field and the applied field reached a locally critical intensity, and (B) Type II superconductors of the hard metals and alloys had comparatively high critical field and temperatures and entered a mixed phase state above a certain less than critical magnetic field independent of sample geometry. The intermediate state and mixed phase state were often confused and generally research was somewhat minimal since practical use of this phenomenon looked very far away indeed due to temperature (maximum round 7.2° K. for Pb) and field (maximum around 803 gauss for Pb) limitations.

The greater part of scientific research has actually been done since Yntema in 1955 created the first successful high field superconductive electromagnet by using unannealed niobium wire to attain 7.1 Kgauss. He was soon followed by other experimenters who made use of cold working technology to improve the performance of niobium windings. Finally, since 1961 Kunzler and others successfully developed alloying techniques which produced Type II superconductors capable of withstanding (NbSn: 200 Kgauss & 18° K.) inordinately high fields and almost "warm" temperatures, before losing their superconductive properties. This ushered in a new era of applied research and development, including: computer switching elements, motors, generators, magnets, and lossless bearings, nearly lossless power transmission lines and transformers, etc.

The Bardeen Cooper Schrieffer Theory of 1957 explained the phenomenological theories of F. London on a microscopic basis. Superconductivity was understood to be: (A) a condensation to lower energy by so-called superelectrons due to a quantum mechanical electron pairing process, (B) this pairing process was seen to occur only within a finite distance, the Coherence Length, which, if longer or shorter than the depth to which a field penetrates into the surface of a sample, meant it was either Type I or Type II, respectively, (C) the critical fields and temperatures were then just the necessary energy inputs to raise the superelectrons of zero resistance to normal electrons of finite resistance, that is, the electron "fluids" were separated by an energy-gap, and (D) the Meissner Effect was due to a sudden condensation energy outflux at the transition, an energy capable of doing magnetic work.

More recently, research is pressing forward at an ever accelerating pace to achieve room temperature superconductors. Some feel that this may be possible by using the long and essentially one dimensional organic molecule, which possesses the necessary symmetry requirements. Some success has been reported, with the present high at approximately 24° K. Generators, motors, power lines and rail transport levitation schemes, using superconductors, have been constructed and successfully tested.

(b) Summary

The Invention is a process cycle for a heat engine utilizing superconductors in the temperature range near absolute zero, in which an applied magnetic field may alternatively be present within, or expelled from, the interior of the subject superconductor, the net effect being to do work on the field, which may then be tapped as a net useful work output. The source of such work to eject the magnetic flux emanates from the quantum mechanical condensation energy responsible for the superconductive state. Any magnetic work performed is accomplished by use of the superconductor's internal energy, resulting in a net latent heat of cooling, for which a heat influx from an external hot temperature heat reservoir is required to complete the cycle. The said cycle involves the adiabatic magneto-caloric effect, with an imposed limiting size constraint on the superconductive particles which will not admit the presence of an intermediate state during phase transition.

A superconductor at or near zero degrees Kelvin can expel an applied internal magnetic field by simply lowering the field below a critical value. This "Meissner Effect" result does work on the applied field, the energy for which comes from the internal energy of the superconductor. The phase transition process is one resulting from a quantum mechanical condensation in the conduction electrons. It will be seen in the following Description of the Invention (particularly graphical FIGS. 3 through 18, together with the relevant description pertaining thereto) that the essence of the cycle ability to convert ambient heat into work derives from quantum mechanical, not thermal, sources. That is, in any process herein discussed all thermally associated thermodynamic process paths are reversible—there is no ambient heat conversions into work resulting therefrom (as is usually the case with the quantum mechanical portion of the energies contribution in the macroscopic size magneto-caloric effect). However, as will be more fully described below, a singular means is provided in accordance with the present invention (substantially, when the size of the superconductor is less than the range of coherence and at least five times the field penetration depth) to cause the quantum mechanical energies of the superconductive phase to have a macroscopic effect and contribute, in a directed manner, to the thermal processes, resulting in an irreversible process of phase transition, the net effect of which converting ambient heat into useful work, in consistency with the Second Law of Thermodynamics.

(c) Advantages

The process cycle, in accordance with the present invention, may be adapted for either motor or generator type energies output. In the case of the motor, an energy density of substantially fifty horse power per cubic foot will permit use in mobile as well as stationary employments, i.e., transportation, aviation, nautical and agricultural, as well as household and industrial mechanisms. In the case of the generator, both large utilities and individual consumers may benefit. Uses may range from electrical generating facilities to units no larger than flashlight batteries.

Because no waste heat generates, no low temperature reservoir is needed, nor must energy be invested for its removal. Consequently, any suitable ambient heat source will serve as fuel, which opens a vast use potential hinged on ease of access and availability of motive fuel. For example, the atmosphere is a good heat source, as is the ocean.

As a benefit from operation at cryogenic temperatures, magnetic flux confinement shields of superconductive sheet can be used to minimize and homogenize the magnetic circuit. Further, use of superconductive magnetic bearings offer significant operational efficiencies and life-times.

(d) Materials

The type of superconductors suitable for utilization are of the elemental (Type I) kind, i.e., tin, aluminum, indium, and mercury. These are readily available, and easily purified and machined. Much current cyrogenic technology may be immediately adapted. The self-cooling nature of certain cyclical options obviates the need for refrigeration or cryogenic gases.

(e) Utility

The cycle offers exceptional attractiveness for utilization in a vast range of present mechanisms in which work must be produced or heat must be moved.

II. Introduction To The Prior Art

The concept of utilizing superconductors in a process cycle so as to derive useful work as the result of a heat energy influx has been considered previously by those skilled in the Art. Each such disclosure has addressed the process in terms of conventional thermodynamics, with waste heats rejection at the low temperature extrema, and forced refrigeration by an external work investment.

Conventional concepts in the Art are presented immediately following, which discussion, essentially summarizing the above cited Thesis, forms the base of understanding the Invention.

A. Nature of the Energies Involvement in the Superconductive Phase Transition

When a simply connected superconductor switches from the normal to superconductive phase in the presence of a magnetic field, all magnetic flux is expelled from the interior. This event, called the Meissner Effect, occurs even though the applied field has remained steady. The source of this energy to do work to expel the field (which energy augments the external field energy, and is on the order of $H^2/8\pi \cdot V$, where H is the applied field in gauss and V is the superconductive volume in cubic centimeters), emanates from the internal energy of the superconductor, specifically, the difference in free energies between the normal and superconductive phases.

The superconductive phenomena incorporates essentially three energies which sum in any process to yield energy equivalence under the First Law of Thermodynamics. These are:

1. Diamagnetic Work as a reaction to field change, in either electrical or mechanical terms;
2. Specific Heat as a result of temperature variation in either the superconductive or normal phases;
3. Latent Heat as a result of phase variation wherein the phases have different entropy.

During any process on a superconductor the phase space variables are changed (in H-T space, where H defines the magnetic field and T defines the temperature). When H changes, energies: $\Delta H^2/8\pi \cdot V$ are registered. When T changes, energies:

$$\int_{T_1}^{T_2} C_n \cdot dT \cdot V_n \text{ or } \int_{T_2}^{T_1} C_s \cdot dT \cdot V_{sc}$$

are registered depending on phase, where $V_n$ and $V_{sc}$ designate the normal and superconductive phase volumes, respectively. When phase changes energies: $((H_o^2 \cdot T)/(2\pi T_c)) \cdot (T/T_c - (T/T_c)^3)$ are registered as a latent heat, positive if transition is from superconductive to normal, negative otherwise.

Any process equates energetistically as follows: Net work out equals change in heat capacity energy over the range of temperature variation during the process, less the difference in latent heats evolved at the temperature extrema. Simply: $W = \Delta(C_s - C_n)\Delta T - \Delta LH \Delta V$, where $(C_s - C_n)\Delta T$ represents the heat capacity energy, and LH represents the latent heat energy, at subject temperature coordinates, and where $\Delta V$ represents the volume of material changing phase. That is:

$$\int_{H_2}^{H_1} H \cdot dM \cdot V_{sc} =$$

$$\int_{T_2}^{T_1} C_s \cdot dT \cdot V_{sc} - \int_{T_1}^{T_2} C_n \cdot dT \cdot V_n +$$

$$((H_o^2 \cdot T_1)/(2\pi T_c)) (T_1/T_c - (T_1/T_c)^3) \cdot \Delta V_1 -$$

$$((H_o^2 \cdot T_2)/(2\pi T_c)) (T_2/T_c - (T_2/T_c)^3) \cdot \Delta V_2,$$

where the critical fields pertain to the applied temperature, and the latent heats evolve as a consequence of phase variation at $T_1$ and $T_2$ ($\Delta V_1$, and $\Delta V_2$).

B. Thermodynamic Cycling of Superconductors

A Description of the Applicant's Master of Science Thesis, 1974

(a) Steps to Achieve a Closed Cycle

There are two essential types of thermodynamical processes that can be imposed on a superconductor: (1) mechanical work output and (2) electrical work output, in either case involving a heat input, as a consequence of the absence of the superconductive phase during field generation, and presence during field degeneration. The former process is denoted as "Magnetic Striction—Mechanical Relaxation" or "MS-MR", and the latter as "Magnetic Striction—Electrical Relaxation" or "MS-ER".

Details of such a cycle will now be elaborated; please refer to FIG. 2.

The cycle is denoted by movement in H-T space, where the delineation of phase is determined by the Tuyn Curve:

$$H_{cT} = H_o(1 - (T/T_c)^2),$$

where $H_{cT}$ is the critical field other than at zero degrees Kelvin as a function of temperature, T. Hence, $$H_1 = H_{cT_1} \text{ and } H_2 = H_{cT_2}.$$

The applicable critical temperature per field is also directly indicated, specifically, $$T_1 = T_{cH_1} \text{ and } T_2 = T_{cH_2}.$$

There are four steps in achieving a closed cycle, starting at some coordinate, $H_1, T_1$:

(1) Isothermal Magnetization: $H_1$ to $H_2$ @ $T_1$: $(H_1^2 - H_2^2)/8\pi \cdot V_\omega$ (in)
(2) Isomagnetic Cooling: $T_1$ to $T_2$ @ $H_2$: $\int C_n \cdot dT \cdot V + LH_2 \cdot V$ (out)
(3) Isothermal Demagnetization: $H_2$ to $H_1$ @ $T_2$: $(H_2^2 - H_1^2)/8\pi \cdot (V + V_\omega)$ (out)
(4) Isomagnetic Heating: $T_2$ to $T_1$ @ $H_1$: $\int C_s \cdot dT \cdot V + LH_1 \cdot V$ (in), where V is the specimen volume and $V_\omega$ is the volume of the magnetic working space enclosing the specimen.

Useful works are derived from the difference, if any, in the energies between process Steps 1 and 3, whereas heat fuel is determined by the difference between process Steps 2 and 4.

1. Analysis of Useful Works

Step 1 demands an energy investment so that the magnetic field intensity may be incremented over a constant volume, V. This energy is simply the difference in energies before and after implementation of Step 1. This entails changing the field from $H_1$ to $H_2$ while $\mu = \mu_o$. Essentially, $(H_1^2 - H_2^2)/8\pi \cdot V$ constitutes the work.

Step 3 demands an energy extraction so that the magnetic field intensity may be decremented over a constant volume, $V_\omega$, and also an additional energy removal resulting from a contribution to the magnetic energy caused by the perfect diamagnetics of a superconductor, due to the Meissner Effect, within the volume, V. Thus, at the thermodynamical point $(H_2, T_2)$, the superconductor phase changes to superconduction without work investment, but effects an energy contribution to the magnetic energy as: $H_2^2/8\pi \cdot V_\omega + H_2^2/8\pi \cdot V$, where V is the superconductive volume and the latter term is the thermodynamical normalization energy for the superconductor. Thus, the energy involved in the field decrease is: $(H_2^2 - H_1^2)/8\pi \cdot (V_\omega + V)$.

The net work is determined by the difference registered between works involved during Steps 1 and 3. Based on the foregoing, this is just: $(H_2^2 - H_1^2)/8\pi \cdot (V_\omega - V_\omega + V)$, or simply, $W = (H_2^2 - H_1^2)/8\pi \cdot V$, which is the work done by the superconductor only.

It should be noted that the phase change to the superconductive state by the superconductor can involve a compression of the field into a smaller remaining cross-sectional area.

2. Analysis of Heat Fuel

Step 2 demands an energy extraction so that the temperature of the superconductor can be lowered from $T_1$ to $T_2$ for a volume $V_s$. This energy is determined by the integral of $C_n$ over the temperature region concerned:

$$Q = \int_{T_1}^{T_2} C_n \cdot dT \cdot V.$$

This is the energy that must be removed from the superconductor to permit $T_2$ to be attained. At the thermodynamic point $(H_2,T_2)$, phase changes from normalcy to superconduction. A latent heat is consequently liberated at $T_2$, of: $Q=((H_o^2 \cdot T_2)/(2\pi T_c))(T_2/T_c-(T_2/T_c)^3)\cdot V$, due to entropy variance between phases at $T_2$. Hence, the total heat removed from the superconductor in Step 2 is:

$$Q = \int_{T_1}^{T_2} C_n \cdot dT \cdot V +$$

$$((H_o^2 \cdot T_2)/(2\pi T_c))(T_2/T_c - (T_2/T_c)^3) \cdot V.$$

Step 4 demands an energy investment so that the temperature of the superconductor can be raised from $T_2$ to $T_1$, for a volume of $V$. As in Step 2, the energy is determined by the integral of the heat capacity, which in this case is for the superconductive phase, $C_s$, as:

$$Q = \int_{T_2}^{T_1} C_s \cdot dT \cdot V.$$

This is the energy that must enter the superconductor to permit $T_1$ to be attained. As in Step 2, a latent heat is consequent to the phase change at coordinate $(H_1,T_1)$, whereat superconduction switches back to normalcy. This heat adduces as energy input of: $Q=((H_o^2 \cdot T_1)/2\pi T_c))(T_1/T_c-(T_1/T_c)^3)\cdot V$. Hence, the total energy introduced into the superconductor in Step (4) is:

$$Q = \int_{T_2}^{T_1} C_s \cdot dT \cdot V +$$

$$((H_o^2 \cdot T_1)/(2\pi T_c)) (T_1/T_c - (T_1/T_c)^3) \cdot V.$$

The net heat fuel is determined by the difference registered between heats involved during Steps 2 and 4. Based on the foregoing, this is:

$$Q = \int_{T_1}^{T_2} (C_n - C_s) \cdot dT + (H_o^2 \cdot T_2)/(2\pi T_c)) (T_2/T_c -$$

$$(T_2/T_c)^3) - ((H_o^2 \cdot T_1)/(2\pi T_c)) (T_1/T_c - (T_1/T_c)^3),$$

where all terms are multiplied by $V$.

It should be noted here that the subject of the present invention is the means via which temperature cycling is automatic, without heat removal, nor waste heats rejection, which the foregoing does not entertain.

Now, Steps 1 and 3 involve work and 2 and 4 involve fuel; hence, work should equal fuel, that is: $1+3=2+4$. And, $$(H_2^2 - H_1^2)/8\pi = \int_{T_1}^{T_2} (C_n - C_s) \cdot dT +$$

$$((H_o^2 \cdot T_2)/(2\pi T_c)) (T_2/T_c - (T_2/T_c)^3) -$$

$$((H_o^2 \cdot T_1)/(2\pi T_c)) (T_1/T_c - (T_1/T_c)^3),$$

where each term is multiplied by the superconductor volume, $V$; accordingly, $W=Q$.

3. Analysis of Step Paths

Step 1 requires an isothermal normalcy, while Step 2 requires an isomagnetic normalcy. Because the phase in Steps 1 and 2 is the same, they can be conducted in simultaneity, with the same thermodynamic result as if performed consecutively. This is similarly true for Steps 3 and 4, as they both entail the superconductive phase. Hence, in Steps 1 and 2 the change in magnetic field must just precede change in temperature, so that always the thermodynamic path is just on the normal side of the Tuyn Curve; and in Steps 3 and 4 the change in field must also precede change in temperature, so that always the thermodynamic path is just on the superconductive side of the Tuyn Curve. Thus, always $dH/dt$ must precede $dT/dt$, where the time rate of change of the superconductor temperature, $dT/dt$, defines the minimum time rate of change of the magnetic field, $dH/dt$, per the Tuyn Curve. Thus, for Steps 1 and 2 $H>H_{cT}$ and for Steps 3 and 4 $H<H_{cT}$, where H is defined as the in-process magnetic field value. In FIG. 2, Steps 1 and 2 are represented by curve 1, and Steps 3 and 4 by curve 2.

(b) Operative Considerations

When the phase of the superconductor becomes superconductive while in the presence of a magnetic field, if the cross-sectional area of the volume transitioning is very small as compared to the field cross-sectional area, then compression of flux into the remaining cross-section can be ignored. When the demagnetizing coefficient is close to zero, transition of phase can be expected to be sharp and complete. That is, a small change in H or T will result in phase variation. Flux compression is a phenomena associated with confined magnetic fields due to superconductive sheets. See for instance J. Appl. Phy. 33, 875 (1962), hereby incorporated by reference. For the very general case, both a demagnetization due to confinement and geometry will be operating.

The Tuyn Curve defines $H_{cT}$ and $T_{cH}$. When D, the demagnetizing coefficient (here inclusive of geometry and confinement), equals zero, these criteria establish the thermodynamic coordinates for complete transition. When D varies between zero and unity, the thermodynamic coordinate may involve the intermediate state. The intermediate state will occur for any field larger than: $H_M=(H_c-H)/D$. Thus, complete superconduction is available only below $H_M$. When the intermediate state is involved, the work output will depend on the difference under the magnetization curves peculiar to the demagnetization factor operating.

(c) Cyclical Considerations

Latent heats will evolve at $T_1$ and $T_2$ depending upon the volume transitioning (as affected by demagnetization effects). Latent heat may evolve during cyclic processes if $\Delta M/4\lambda D$ induces phase volume changes, where M is the magnetization. In any event, the latents evolutions will engender waste heats output at $T_2$, the low temperature reservoir, unless $T_2$ equals zero degrees Kelvin.

(d) Embodiment Considerations

For an MS-MR, motion of the superconductor, $\Delta X$, relative to a steady magnetic field (which adduces a surface diamagnetic force, F) both secures $\Delta X$ in $W = F \cdot \Delta X$ and $\Delta H$ in $W = (\Delta H)^2/8\pi$. For the MS-ER, the field magnet current cycles; the variation secures $\Delta \Phi$ in $W = \Delta \Phi^2 \cdot (l/\mu \Delta A)$, where A is the area, and l is the length of the subject magnetic circuit.

In practical construction, a magnetic circuit would be designed utilizing flux confinement via superconductive diamagnetic surfaces in order to minimize and homogenize the field. See for instance J. Appl. Phy. 33, 875 (1962), hereby incorporated by reference. For a general discussion of energy conversion by superconductors see for instance J. Appl. Phy. 33, 643 (1962), hereby incorporated by reference.

To avoid confusion, the above discussion elaborates general thermodynamic principles in the current art of superconductivity, and has relevance to the following invention description. However, as will be noted, the concept of an intermediate state is without applicability, as operative above, in the invention since the geometrical constraints which are fundamental to its description do not admit this as a possibility.

C. The Magneto-Caloric Effect

The energy conversion process elucidated above employs a rather unfortunate cycle: one demanding temperature cycling via external assistance in the form of work. This periodic temperature variation can never achieve 100% efficiency with any conventional cyclic processing.

It is, however, possible to cause a superconductor to self-cool when driven normal by a magnetic field, while adiabatically isolated. This can be understood as follows: The entropy of the normal state is always larger than that of the superconductive state, except at absolute zero and $T_c$, whereat the entropies are equal. Because $dQ = TdS$, a phase change at T will cause the liberation of heat, where $S_n < S_s$, i.e., where $0K < T < T_c$, and where $S_n$ and $S_s$ are respectively the normal and superconductive phase entropies. This is accomplished by driving the superconductor into alternative phase while in the presence of a magnetic field (lest any transition be at $T = T_c$ only). Thus, if a transition is from superconduction to normalcy, the entropy of the latter phase exceeds the former, hence, latent heat of cooling transpires, of value $dQ = TdS$. Now, for temperature variation purposes, the cooling must be accomplished adiabatically, since this will cause the heat to engender from the internal heat energy of the superconductor itself. The final temperature is attained when the latent heat is fully supplied by the volume heat energy via an isentropic process. Hence, temperature variation may occur with the aid of the innate latent heat. See for instance Cryogenics, December 1960, page 101, hereby incorporated by reference. It is important to note that a transition from superconduction to normal will result in a cooling, whereas a transition from normal to superconduction will result in a heating.

Temperature variation by "adiabatic magneto-caloric magnetization" has long been addressed in the journal literature, signally by the work of Keesom & Kok, Physica I, 595 (1934), hereby incorporated by reference.

D. Physical Description of the Superconductive Phase Transition

Following is a detailed explanation in outline form of the view taken to describe the phase transition process used in later sections of this application.

(A) General
1. At Absolute Zero a superconductor can do magnetic work on the order of $H_o^2/8\pi \equiv \Delta F$.
2. At finite temperatures the free energy is defined as: $\Delta F = \Delta U - T \Delta S = H_c^2/8\pi$. The change in internal energy is: $\Delta U = H_c^2/8\pi + T\Delta S$. Hence, the phase transition involves magnetic and caloric energy investment. In a closed cycle, this may be expressed as:

$$\int_0^T C_s dT + T\Delta S - (H_o^2 - H_c^2)/8\pi = \int_0^T C_n dT.$$

3. A two fluid hypothesis is forwarded whereby there are: (1) normal conduction electrons and (2) superelectrons.
   (1) All entropy is attributable to crystal lattice and normal conduction electrons.
   (2) Superelectrons are at zero entropy, and temperature T.
   (3) An order parameter is introduced, $\omega$, whereby it has the value of 0 at 0K and 1 at $T_c$; and this defines the proportion of conduction electrons that are 'normal' at T, $(0 \leq T \leq T_c)$.
   (4) Based upon (1) & (2), $\omega$ is defined by $S_{es}/S_{en}$, where $S_{es}$ and $S_{en}$ define the entropy of the conduction electrons in the superconductive and normal phases, respectively. This may be expressed as:

$$\int_0^T dS_{en} = \int_0^T C_{en}/T \cdot dT, \text{ and}$$

$$S_{en} - S_{es} = -H_c/4\pi \cdot dH_c/dT.$$

4.
   (1) At zero degrees the free energy difference between phases is: $H_o^2/8\pi$, and Nernst's Theorem both phases have zero entropy; thus, the conduction electrons of $\omega = 0$ must condense to a lower ground state (in BCS parlance this is the sum of the binding energy of all Cooper Pairs, $\Delta F = H_o^2/8\pi = 3.52 \, kT_c n$, where n is the number of pairs).
   (2) The condensation energy, $\Delta(T)$, decreases with increasing temperature as Cooper Pairs are broken-up.

(B) Macroscopic Description
1. A latent heat is supplied at the isothermal phase transition. This is interpreted as $(1-\omega)$ of the conduction electrons at temperature T with entropy of zero, raised to $S_{en}$. That is: $LH = T\Delta S = T(S_n - S_s) = T(S_{en} - 0)(1-\omega)$.

(C) The Magneto-Caloric Effect
1. A superconductive to normal phase transition is induced in an adiabatically isolated specimen, by an infinitesimal increase in the applied magnetic field at finite temperature. An infinitesimal portion of the specimen will transition to normal phase, with the specimen temperature dropping slightly at its internal energy supplies the latent heat required.

2. The view above suggests an increase in entropy for the process, since essentially it is one of combining two fluids at different entropy; the resultant (per the Second Law) is larger than the sum of the original parts. That is: $S_{en'}\cdot\omega\cdot(V-V_T)+S_{en}\cdot\omega\cdot V_T+0\cdot(1-\omega)\cdot V_T < S_{en'}\cdot(\omega'\cdot(V-V_T)+\omega'\cdot V_T+(1-\omega')\cdot V_T)$, where V defines the total specimen volume and $V_T$ defines the volume undergoing phase transistion $(V>>V_T)$, and where $S_{en'}<S_{en}$ because the temperature of the specimen dropped as a whole, adducing a new $\omega$, $\omega'$, where $\omega'<\omega$.

3. It is known that the magneto-caloric effect is, in fact, an isentropic process.

4. (C) 3. can be reconciled with (C) 2. only if something other than (B) 1. is assumed responsible for the latent heat evolution (that is, the model forwarded in (A) 3. is too simple). The solution is suggested by (A) 4. (1) whereby a quantum mechanical condensation is indicted, formulated two ways, as follows:

(D) Microscopic Description: Primary Formulation

1. The foregoing remarks suggest that:
   (1) The superelectrons are at zero entropy and zero degrees (not T, as assumed above).
   (2) The superelectrons additionally are condensed into a quantum mechanical ground state of energy $\Delta(T)$ less than the normal conduction electrons energy state.
   (3) The two fluid model continues otherwise as described in A).

2. The latent heat is then interpreted as the combination of supplying:
   (1) Energy to eliminate the Cooper Pair condensation potential, $\Delta(T)$;
   (2) Energy to raise the superelectrons to T from 0K, that is:

$$\int_0^T C_{en}dT(1-\omega).$$

3. The difference in internal energy between the phases is, then:

$$\Delta U = H_c^2/8\pi + (\Delta(T) - H_c^2/8\pi) + \int_0^T C_{en}dT(1-\omega),$$

where the first two terms relate to (D) 1.

4. The condensation potential, $\Delta(T)$, defines the maximum kinetic energy the superelectrons can acquire and yet have resistanceless current. The kinetic energy, $\frac{1}{2}m_e v_e^2 \cdot 2n$, is determined by motion relative to the crystal lattice which is vibrating due to thermal agitation. At zero degrees, the relative motion is solely contained in the electron kinetic energy and when this equals $H_o^2/8\pi$, the condensation potential, $\Delta(T)$, is entirely supplied. At finite temperatures, lattice vibration will contribute to the velocity term in the kinetic energy of the superelectrons. Hence, the critical field is defined to be that for which the current velocity it induces, combined with the lattice thermal vibration, just equals the critical depairing velocity of the Cooper Pairs. Thus, the critical magnetic field does not completely remove the condensation potential, and the portion remaining (which was associated with the lattice vibration) is related to the temperature as:

$$\int_0^T C_{en}dT(1-\omega).$$

It is this energy that the lattice vibration contributes to the relative motion of the superelectrons, and consequently, the depairing velocity of the critical current, while not contributing actually to the electron kinetic energy. That is:

$\Delta(T) = H_c^2/8\pi + \frac{1}{2}m_e v_L^2 \cdot 2n$, and $$\frac{1}{2}m_e v_L^2 \cdot 2n = \int_0^T C_{en}dT(1-\omega), \text{ and } \frac{1}{2}m_e v_e^2 \cdot 2n = H_c^2/8\pi.$$

(E) Application of the Description to the Magneto-Caloric Effect

1. In the adiabatic superconductive to normal state phase transition induced by an infinitesimal increase in the applied magnetic field, comments in (C) 1. apply.

2. The process is isentropic because:
   (1) The condensation potential of the superelectrons is partially supplied by the magnetic field: $H_c^2/8\pi \cdot V_T$.
   (2) The remaining condensation potential is supplied by the lattice and normal conduction electrons internal energy:

$$(\Delta(T) - H_c^2/8\pi)V_T = \left( \int_{T_{1E}}^{T_{2E}} C_L dT + \int_{T_{1E}}^{T_{2E}} C_{en}dT \cdot \omega \right) V.$$

Since the entropy of the superelectrons remains zero, the specimen entropy decreases by:

$$\Delta S = \int_{T_{1E}}^{T_{2E}} (C_L + C_{en}\cdot \omega)/T \cdot dT \cdot V.$$

(3) The superelectron 'quasi-particles' now gain finite entropy at the expense of the lattice and normal portion of the conduction electrons. The combination of 'fluids' at different entropies results in a net increase in the specimen entropy. The energy exchange is:

$$\int_0^{T_{3E}} C_{en}dT(1-\omega) \cdot V_T.$$

The increase in entropy is given by:

$$\Delta S = \int_0^{T_{3E}} C_{en}/T \cdot dT \cdot (1-\omega)V_T -$$

$$\int_{T_{2E}}^{T_{3E}} (C_L + C_{en}\cdot \omega)/T \cdot dT \cdot V.$$

(Subscripts 1E, 2E, and 3E refer to values at the indicated process points.)

(4) Entropy variation is (2) equals that of (3).

(F) Microscopic Description: Secondary Formulation

1. The foregoing remarks in Sections (A) through (C) suggest that:
   (1) The superelectrons are at zero entropy and are at the temperature of the lattice, T.
   (2) A quantum mechanical condensation mechanism is responsible for, and directly results in, (1) above.
   (3) The two fluid model continues as otherwise described in A.

2. The latent heat is interpreted as the simultaneous effect of supplying heat to raise the entropy and eliminate the condensation potential, $\Delta(T)$. In this view, the existence of the condensation potential is responsible for the entropy decrease at T below that of $S_{en}$.

(G) Application of the Description of the Magneto-Caloric Effect

1. In the adiabatic superconductive to normal state phase transition induced by an infinitesimal increase in the applied magnetic field, comments in (C) 1. apply.

2. The process is isentropic because:
   (1) The condensation potential is partially supplied by the magnetic field: $H_c^2/8\pi \cdot V_T$.
   (2) As the remaining condensation potential is supplied, the entropy of the superelectrons increases. This energy is derived from the lattice and normal portion of the conduction electrons:

$$(\Delta T) - H_c^2/8\pi) \cdot V_T = \left( \int_{T_{1E}}^{T_{3E}} C_L dT + \int_{T_{1E}}^{T_{3E}} C_{en} dT \cdot \omega \right) \cdot V.$$

(There is no $T_{2E}$ in this view.)

(3) The entropy variation is zero because:

$$\Delta S = S_{1E} - S_{2E}, \text{ and } S_{1E} =$$

$$\int_0^{T_{1E}} (C_L + C_{en} \cdot \omega)/T \cdot dT \cdot V, \text{ and}$$

$$S_{2E} = \int_0^{T_{3E}} (C_L + C_{en} \cdot \omega) \cdot V/T \cdot dT +$$

$$\int_0^{T_{3E}} (C_{en} \cdot (1 - \omega)) \cdot V_T/T \cdot dT, \text{ and } S_{1E} = S_{2E}.$$

That is:

$$\int_{T_{1E}}^{T_{3E}} (C_L + C_{en} \cdot \omega)/T \cdot dT \cdot V = S_{en} \cdot (1 - \omega) \cdot T_{3E} \cdot V_T.$$

(In the foregoing, as in Section E), $\omega$ is assumed constant for simplicity.)

(H) Means to Predict the Instantaneous Entropy Value During Phase Transition

1. Formulation of the process in Sections (D) and (E) permits prediction of the instantaneous entropy value.

2. Formulation of the process in Sections (F) and (G) does not permit prediction of the instantaneous entropy value, as no correlation between variation in the energy gap with the superelectron entropy is known. Whether the relationship is exponential, linear, or some other function is not indicated. All that is predicted is the beginning and ending entropy values, which are the same as for (H) 1., since the latent heat evolution predictions are the same:

Per the electronic specific heat equation:

$Q = \int B \cdot T \cdot C dT$ ergs/cc.,
$LH_{1E} = T_{3E}^2/2 \cdot B \cdot C \cdot (1-\omega) + \Delta(T) - H_c^2/8\pi$, and
$LH_{2E} = T_{3E}^2 \cdot B \cdot C \cdot (1-\omega),$ where $LH_{1E}$ refers to (H) 1. and $LH_{2E}$ refers to (H) 2., and $LH_{1E} = LH_{2E}$, (where B and C are constants).

3. I take the view that it is physically accurate to utilize the formulation in (H) 1. to describe the instantaneous entropy during a phase transition process, and this approach will be used in describing the entropy of the Segment during a Coherent Magneto-Caloric phase transition, infra. For a further description of this formulation, including an experimental test, see Daunt and Mendelssohn, Proc Roy Soc, A185, 225 (1946), hereby incorporated by reference.

III. Summary Of The Invention

The invention concerns methods to achieve a closed thermodynamic cycle applied to superconductive materials and heat engine embodiments employing said methods to produce work.

There are three basic process methods which can be used, all of which involve a superconductor of Type I properties, which cross-sectional diameter is less than (or on the order of) the range of coherence of the superconductive electrons, and which said superconductor is isolated from external electrical and thermal contact during appropriate junctures of the said cycle. In all said cyclic processes, a magnetic field is applied to the said superconductor to drive it into alternative phase (superconductive to normal by field increase, or normal to superconductive by field decrease) which event involves initially a change in magnetic susceptability of said superconductor followed substantially by thermal adjustment occasioned by an evolution of latent heat (cooling if phase changes to normal, heating if phase changes to superconductive) under adiabatic conditions. All said cyclic processes involve transition to alternative phase followed by transition of phase back to that initially obtaining. The status of the initial phase and the nature of the isolation of said superconductor delimit which of the three said cyclic methods is employed.

Coherent Magneto-Caloric Magnetization is a method whereby said superconductor is thermodynamically cycled with given initial cycle parameters of: (a) starting temperature below $T_c$, (b) applied magnetic field below $H_{cT}$, (c) in the superconductive phase, and (d) isolated thermally and electrically. The said applied magnetic field is increased inducing a magnetization change in said superconductor from that characterized as diamagnetic to nonmagnetic evidencing commencement of phase change to normal. Concomitantly is the evolution of a cooling latent heat which adiabatically cools said superconductor to a temperature less than the said starting temperature, while said field increases so as to retain the new phase. Upon attainment of thermal equilibrium, phase variation has concluded, whereupon the said field is reduced until magnetization of said superconductor changes back to that characterized as diamagnetic from nonmagnetic, evidencing commencement of phase change to superconductive. Concomitant is the evolution of a latent heat of heating, which, while said magnetic field decreases so as to retain the new phase, results in a new temperature for said superconductor which is lower than the said starting temperature. Isolation now terminates thermally (continuing electrically) during which heat enters from an external region or reservoir having any temperature above said starting temperature, which heat returns said superconductor to the said starting temperature with consequent closure of the cycle. A variant approach is to permit heat entry during the latents heating portion of the cycle; said heats entry will return the temperature of the said superconductor to the said starting temperature. Net magnetic work is produced during said field decrease in the presence of the diamagnetic magnetization of said superconductor; net fuel constitutes said heat entry from said external source.

Coherent Magneto-Caloric Demagnetization is a method whereby said superconductor is thermodynamically cycled with given initial cycle parameters of: (a) starting temperature below $T_c$, (b) applied magnetic field above $H_{cT}$, (c) in the normal phase, and (d) isolated electrically and thermally. The said magnetic field is decreased inducing a magnetization change in said superconductor to that characteristic of superconduction (diamagnetic) evidencing commencement of phase change to superconductive. Concomitantly is the evolution of a latent heat of heating which adiabatically heats the said superconductor to a temperature greater than the said starting temperature, while said field decreases so as to retain the new phase. Upon the attainment of thermal equilibrium, phase variation has concluded, whereupon the said field is reduced until magnetization of the said superconductor changes back to that characteristic of the normal phase (nonmagnetic), evidencing commencement of phase change to normal. Concomitant is the evolution of a latent heat of cooling, which, while said magnetic field increases so as to retain the new phase, results in a new lower temperature for said superconductor which is less than that of the said starting temperature. Thermal isolation now terminates (continuing electrically) during which heat enters from an external region or reservoir having any temperature above that of the said starting temperature, which returns said superconductor to the said starting temperature with consequent closure of the cycle. A variant approach is to permit heat entry during the latents cooling portion of the cycle; said heats entry will return the temperature of the said superconductor to the said starting temperature. Net magnetic work is produced during said field decrease in the presence of the diamagnetic magnetization of said superconductor; net fuel constitutes said heat entry from said external source.

Enhanced Coherent Magneto-Caloric Demagnetization is a method employing the above Demagnetization method, whereby said heat entry from said external source is completely or partially accomplished during the latents heating portion of the cycle. The net effect of which enhances the difference between the temperature extrema of the cycle, and, consequently, work production is greater than that of the said above demagnetization method cycle.

There are two basic embodiments of the heat engine reflecting the means by which magnetic work is channeled for useful employment: a motor and a generator. In either, an environment of substantial cryogenic integrity is utilized for the components associated with the process cycles by means of thermal insulators, radiation shields, and vacuum, as is familiar to the current art of low temperature physics. The starting temperature is initialized via use of a cryogenic refrigerant or similar means. The heat engine employs means to adjust the said applied magnetic field necessary to accomplish the said closed thermodynamic cycle methods via utilization of magnetic field producing agencies, including superconductive solenoids, solenoids, or permanent magnets; and also means to admit said heat entry from said external environs via use of a heat conductive conduit, or other thermal transfer means such as fluidic flow, where one end is in good thermal contact with said hot external environs while the other end is in good thermal contact with the said superconductor either dirctly or via radiative or conductive heat transfer means at appropriate junctures in the said cycles. Said magnetic field variation and said heat entry rate are regulated to assure cyclic operation of the said coherent magneto-caloric methods via alteration in the angular velocity of the armature (which may compose either the said magnetic field agency or the said superconductor) in the case of a motor, or time rate of change of the current in the windings of the said solenoids, or other included windings, in the case of a generator, and also effects heat rate transfer from said external environs via regulation of a heat valve situate along said heat conduit. A plurality of superconductive particles may be employed, each retaining substantial thermal and electrical isolation as demanded by said closed thermodynamic cycles, while collectively in mechanical association. The preferred embodiment takes account of magnetic hysteresis and offers means, such as local affection of the ordering parameter, to reduce or eliminate it, and minimizes the required said magnetic field agency and its associated field via use of superconductive magnetic field containment shields.

The work converted from heat in the motor embodiment is mechanical in form and derived from unequal magnetic forces exerted about the axis of rotation of the armature; specifically arising because of nonmagnetic magnetization of the said superconductor in the direction of motion towards increasing field and diamagnetic magnetization of the said superconductor in the direction towards decreasing field.

The work converted from heat in the generator embodiment is electrical in form and derived from a net induced EMF in windings situate encompassing said magnetic field; specifically arising because of the nonmagnetic magnetization of the said superconductor during said field increase and diamagnetic magnetization of the said superconductor during field decrease.

DETAILED DESCRIPTION OF THE PREFERRED EMBODIMENTS

In order to attain a process in which ambient heat is converted into useful work, a self-cooling condition, without work investment, must be established. The first requirement can be met by utilization of the magneto-caloric effect. However, the second requirement fails: the magneto-caloric effect demands a magnetic work investment concurrent with cooling. Upon heating, this same work returns as an output; there is no net heat transfer from an external reservoir.

This may be understood as follows: Variation of the applied magnetic field in small increments causes attendant variation of phase, but only such volume changes so that, given sufficient time for volume-wide thermal relaxation, the present field value is precisely $H_{cT}$. What this means is that the superconductor passes through, in the words of Keesom and Van Laer, Physicà IV, 487 (1937), hereby incorporated by reference, "a sort of intermediate state". The nature of this mixture of phase has two results: (1) provides an isentropic transitional process, and (2) secures an entirely reversible phase transition both from the standpoints of magnetic and caloric energy investments.

This seeming impediment vanishes under one particular volumetric boundary condition: The cross-sectional diameter is on the order of the range of coherence, $\xi(T)$, the distance over which the number of superelectrons can appreciably vary. This is usually on the order of about $10^{-4}$ centimeters.

When the dimensions of the superconductor are less than $\xi(T)$, no intermediate state can engender: the material must be either completely normal or completely superconductive. Quoting A. B. Pippard, Phil. Mag. 43, 273 (1952), hereby incorporated by reference, " ... It is clear than in a colloidal particle of diameter of less than $10^{-4}$ cm the transition from one phase to the other cannot occur by the creation of a phase boundary, but must first affect the whole particle at once. ... The series of measurements by Shoenberg (1940) on Mercury colloids of progressively greater uniformity lend some support to the hypothesis that the transition of a single particle is accomplished suddenly, without the appearance of the intermediate state." This absence of an intermediate state has been observed by O. Lutes and E. Maxwell, Phy. Rev. 97, 1718 (1955), hereby incorporated by reference, who experimented with whiskers of tin. Quoting their article, "With reduction of wire diameter ... at some field, between $H_c/2$ and $H_c$, the free energies of normal and superconducting states must equal. Thus, ... if the intermediate state has not appeared when this field is reached, the specimen will prefer a direct transition from the superconducting to the normal state. Hence, no intermediate (state) will be observed."

In the bulk case (volume much larger than $\xi^3$), starting at $T_1$, a certain isentropically adduced $T_2$ is magneto-calorically induced. The bulk magneto-caloric process is one of infinitesimal boundary zone phase transitions occurring essentially isothermally due to immediate connection to the specimen volume heat capacity. The result is work done upon only the remaining superconductive volume, with heat being generated as the latent heat, per the ambient temperature of the boundary layer, for the volume undergoing transition. This heat is absorbed by the volume, $\int C_n \cdot dT$ for the normal and $\int C_s \cdot dT$ for the superconductive component volumes of the whole specimen, before another boundary layer transitions. The result is wholly isentropic and reversible.

For Coherent Magneto-Calorics (a magneto-caloric process performed under the constraint that the cross-section is less than the range of coherence) with bulk volume thermodynamics still in effect, the particle cannot enjoy a continuous infinitesimal phase transition process. This event suggests that the latent heat characteristic of $T_1$ is volume wide in its evolution.

Thus, what is the underlying impediment to utilizing the magneto-caloric effect, the presence of the "sort-of-intermediate state" which causes work investment because of retention of a portion of the superconductive phase volume during processing, is eliminated: No intermediate state is possible if d, the cross-section, is less than $\xi$ (with $\xi(T)$ being synonomous, but emphasizing $\xi$ as a function of temperature). Hence, if $d < \xi(T)$, once $H > H_{cT}$ transition from superconduction to normalcy must be discrete; that is, volume-wide at once.

While the dimension of the superconductor preferably should not exceed $\xi(T)$, it is also preferred that the cross-section not be less than that characteristic for a second order phase transition under the Ginzburg-Landau Theory. That is: $\sqrt{5}\lambda(T) < d < \xi(T)$, where $\lambda(T)$ is the penetration depth of the applied magnetic field into the superconductor surface. Obviously, in the absence of latent heat at the phase transition, no self-cooling can enfold. Generally, full latents evolution can be expected for $d > 5\lambda(T)$. See for instance Phy. Rev. Lett. 7, 14 (1961), hereby incorporated by reference. Hence, superconductors suitable for processing preferably have $\xi(T) \geq 5\lambda(T)$, i.e., tin, indium, aluminum, among others.

It is also preferred that bulk (large volume specimen of $\xi^3 >> 1$) caloric and magnetic functions continue to obtain, through dimension approaches $5\lambda(T)$. Experiments on "zero-dimensioned" ensembles of tin particles, per heat capacity, $T_c$, and magnetization measurements, indicate bulk properties continue down to about $d = \xi(T)$, and substantial bulk values persist to about $d = 0.2\xi(T)$. See for instance J. Phy. Soc. Jap. 43, 444 (1977) and 42, 437 (1977), hereby incorporated by reference. From this standpoint d should be as large as possible to ensure bulk thermodynamics, yet retain the discrete transition property of coherency. (Note that the ensemble used in the references above did not consist of particles sufficiently thermally isolated to result in an individualistic coherent adiabatic process.)

It should also be noted that even if $d > \xi(T)$, some net heat energies conversion will still involve. If $d = 2\xi(T)$, energy conversion will be about 0.28 of the $d = \xi(T)$ energy. At $d = 10\xi(T)$, energy conversion will be about 0.2 of the $d = \xi(T)$ value. At $d100\xi(T)$, essentially bulk magneto calorics obtain, meaning energies conversion is net zero; the process is cyclically reversible. This result may be seen as follows:

The familiar bulk "sort-of-intermediate state" process will ensue for volume phase transitions until the last $\xi^3$ nucleus of former phase remains, whereat its transition is discrete. As the volume larger than $\xi^3$ is increased (say to $100\xi^3$), the discrete transition energies conversion are lost in the much larger heat capacity of volume greater than $\xi^3$, until the coherent process is lost indetectably to the bulk process. FIG. 21 represents the Thermosynthetic energies conversion expectancy (Thermosynthesis designating a direct ambient heat conversion into useful work) as a function of cross-sectional diameter, $N \cdot \xi(T)$. Shown here is the representative case for tin undergoing a Coherent Magneto-Caloric Magnetization Cycle starting at $T_1 = 0.6T_c$.

A familiar feature of the superconductive phase transition is hysteresis in the requisite magnetic field for transition. For the superconductive to normal transition, a field higher than $H_{cT}$ may be required, which is called the superheating field. For the normal to superconductive transition, a field lower than $H_{cT}$ may be required, which is called the supercooling field. Predictions for the maximum that these fields can become are given in Phil. Mag. 43, 273 (1952) and J. Appl. Phy. 36, 80 (1965), both citations hereby incorporated by reference, for "coherently sized" particles. Generally, energy $(H_{sh}^2 - H_{cT}^2)/8\pi$ and $(H_{cT}^2 - H_{sc}^2)/8\pi$ is lost as heat, where $H_{sh}$ is the superheating field and $H_{sc}$ is the supercooling field, respectively.

Hysteresis phenomena operative upon a coherently dimensioned particle, where $\xi(T) > \sqrt{5}\lambda(T)$ can be viewed as the result of creation of a potential barrier that must first be overcome if transition is to ensue. The potential barrier emanates from the fact that the field penetrates only the surface region of $\lambda(T)$, yet the coherent nature of the transition reflects this attendantly upon the sheltered interior regions when the phase is to change.

Hysteresis in coherently sized particles (hereinafter referred to as "Segments") is controllable in a number of ways, discussed infra. It should be remarked that the size required of Segments, "coherently dimensioned", introduces the typical increase in $H_{cT}$ associated with thin films. See for instance Phil. Mag. 43, 273 (1952), hereby incorporated by reference. The order of the increase is given by $H_s/H_{cT} = 1 + \lambda/d$, where $H_s$ is the effective critical field, and $\lambda$ is the field penetration depth. This result does not affect the calculation of work under the magnetization curve, but does require that where $H_{cT}$ is indicated herein, it should appropriately be $H_s$ (the calculation of work continues to use $H_{cT}$ however).

It should also be mentioned that the range of coherence, as well as the field penetration depth are variable with temperature, being minimum at zero degrees Kelvin and infinite at $T_c$. Generally, each vary as: $\beta/\sqrt{(1-(T/T_c)^4)}$, where $\beta$ is the respective value at zero degrees Kelvin ($\xi$ or $\lambda$). Hence, the terms $\xi(T)$ and $\lambda(T)$ denote the range of values resultant over $T_1$ to $T_2$. The criteria for suitable superconductors and sizing must account for the maxima and minima that will occur; however, the variation in $\xi$ and $\lambda$ is very small except in the close vicinity to the zero field critical temperature.

In closing this section, a word concerning embodiments is in order. Since the amount of work produced by cycling only one coherently sized segment is minimal, it is preferred that a plurality of segments be employed to form an "Envelopment". Hence, in the materials that follow, alternatively a single Segment or "Envelopment" may be processed. An "Envelopment" is an ensemble of electrically and thermally isolated, individual Segments which are mechanically associated or joined. Such construction is, therefore, "Thermodynamically Independent and Mechanically Dependent".

Following is an example of a thermosynthetic process cycle in which the initial thermodynamic coordinates are $T_1$ and $H_1$. Phase is superconductive. All field and temperature values are the critical coordinates on the Tuyn Curve. Please refer to FIG. 1.

The cycle is started by increasing the field from $H_1$ to $H_1 + dH$, inducing the normal phase while the Segment is adiabatically isolated. This has the effect to suddenly cause a change in magnetization and also adduce the latent heat of cooling to $T_1$, designated as $LH_1$, which is absorbed by the Segment normal phase heat capacity, designated as $C_n$, until a new low temperature magnetocalorically results, designated as $T_2$. That is:

$$LH_1 = \int_{T_1}^{T_2} C_n \cdot dT$$

(with the volume constant at $V_s$). At $T_2$ the magnetic field is $H_2$, having been incremented as the temperature declined, so that always normal phase was retained, per the Tuyn Curve. Thus, $H_2 > H_1$. Though $H_2$ exceeds $H_1$, no net work was done on the superconductor as the normal phase is non-magnetic. At $T_2$, the field is now reduced to $H_2 - dH$, inducing the superconductive phase while the Segment is still adiabatically isolated. This has the effect to suddenly cause a change in magnetization and also liberate the latent heat of heating of $T_2$, designated as $LH_2$, which is absorbed by the Segment superconductive phase heat capacity, designated as $C_s$, until a new in-process temperature magnetocalorically results, designated as $T_3$. That is:

$$LH_2 = \int_{T_2}^{T_3} C_s \cdot dT$$

(at constant volume, $V_s$), where $T_2 < T_3 < T_1$. The field has reduced attendant to the increase in temperature so that the phase has remained superconductive, per the Tuyn Curve. Thus, $H_2 > H_3 > H_1$. The reduction of the magnetic field from $H_2$ to $H_3$ involved work done by the superconductor of $(H_2^2 - H_3^2)/8\pi \cdot V_s$. Now, at $T_3$, the temperature of the Segment is allowed to increase to $T_1$, due to transfer of heat from an external reservoir, at some temperature greater than $T_1$ into the Segment. The phase remains superconductive since the field declines always at such a rate that the Tuyn Curve is never crossed. The amount of heat that must enter from external regions is:

$$Q = \int_{T_3}^{T_1} C_s \cdot dT \cdot V_s$$

The superconductor does work while the field declines from $H_3$ to $H_1$ of $(H_3^2 - H_1^2)8\pi \cdot V_s$. Now, at $T_1$ and $H_1$, the phase is superconductive and the cycle is complete.

The cycle net heat was:

$$\int_{T_3}^{T_1} C_s \cdot dT \cdot V_s$$

The cycle net work out was: $(H_2^2 - H_3^2 + H_3^2 - H_1^2)/8\pi \cdot V_s = (H_2^2 - H_1^2)/8\pi \cdot V_s$. The result is: heat in of:

$$\int_{T_3}^{T_1} C_s \cdot dT \cdot V_s$$

equals work out of $(H_2^2 - H_1^2)/8\pi \cdot V_s$, with no waste heats rejection, though the value of $T_2$ could have been: $0K \leq T_2 \leq T_1 \leq T_c$.

This was an example of a "Coherent Magneto-Caloric Magnetization Cycle". There are other cyclic process options, which will be detailed following. In all cases, the magnetization of the Segment is affected first, upon phase variation, thereupon followed by caloric relaxation.

Description of the Preferred Process Cycles

There are two essential kinds of Coherent Magneto-Caloric process, depending upon the superconductor phase at commencement of processing. When superconductive phase initially obtains, the process is one of "Coherent Magneto-Caloric Magnetization", since the transition to the normal phase will result in a loss of diamagnetism. When the normal phase initially obtains, the process is one of "Coherent Magneto-Caloric Demagnetization", since the transition to the superconductive phase will result in a diamagnetic magnetization. Another process, called "Enhanced Coherent Magneto-Caloric Demagnetization" is also possible, which will be discussed infra. The optimum cycles for the "Magnetization" and "Enhanced Demagnetization" processes have identical maximum energy conversions expectancies.

It should be noted at the outset that the form of the work output of these cyclic processes may be either mechanical or electrical, directly. For mechanical output, the magnetic field must have a relative motion to the superconductive Envelopment (Segment). For electrical output, there need be no relative motion, but there must be a time varying magnetic field (or else relative motion must obtain). A discussion of embodiments will be presented infra.

In all cases, following, cycles start at $T_1$ and $H_1$, where $0K \leq T_1 \leq T_c$, and T is in reduced units of $T/T_c$, and H is in reduced units of $H/H_c$, where $H_c$ is the critical field at 0K. Description of the instantaneous entropy is based upon the formulation presented supra, Background of the Invention, Section E.

A. Coherent Magneto-Caloric Magnetization

Refer to FIG. 3, regarding the following process steps.

1. Isothermal Adiabatic Magnetization: Phase varies from superconductive to normal, first evidenced by a change in magnetization of the segment to non-magnetic, with latent heat of cooling of $T_1$ evidencing, via application of $H = h_1 + dH$ at $T_1$. H is increased to $H_2$ as defined by Step 2. Work done to increase the magnetic field in the case of a generator is $(H_2^2 - H_1^2)/8\pi \cdot V_\omega$, where $V_\omega$ is the volume occupied by the field (with $\mu = \mu_o$). There is no work necessary to move a normal Segment from $H_1$ to $H_2$ in the case of the motor embodiment. $\Delta H/\Delta t$ is faster than $\Delta T/\Delta t$ in Step 2, per the Tuyn Curve, so that always normal phase obtains.

2. Isomagnetic Adiabatic Cooling: The latent heat of $T_1$, $LH_1$, causes the Segment to cool as the volume heat capacity supplies the difference in phase entropy energy at $T_1$. The final low temperature attained, $T_2$, is defined by:

$$LH_1 \cdot V_s = \int_{T_1}^{T_2} C_n \cdot dT \cdot V_s,$$

where $T_2$ satisfies the integral.

3. Isothermal Adiabatic Demagnetization: At $T_2$, phase is caused to vary from normal to superconductive, which is a first evidenced by a change in magnetization of the segment to diamagnetic, by reducing the field from $H_2$ to $H_2 - dH$. H is decreased to $H_3$, defined by $T_3$ in Step 4. Energy removed from the field in its reduction in the case of a generator is: $(H_2^2 - H_3^2)/8\pi \cdot (V_\omega + V_s)$, where $V_s$ is the volume of the superconductive Segment. Work, in the case of a motor, is due to removal of the superconductive diamagnet from higher to lower field: $(H_2^2 - H_3^2)8\pi \cdot V_s$. The rate of change of H is such as to maintain the superconductive phase, per Step 4, i.e., $H < 1 - (T/T_c)^2$, where $T_c$ is the reduced critical temperature.

4. Isomagnetic Adiabatic Heating: The latent heat of heating $T_2$, $LH_2$, will evolve upon phase variation in Step 3, where $T_2 < 0K$. This difference in entropies of phase energy will be absorbed by the superconductive heat capacity, establishing a final higher temperature, $T_3$, as:

$$LH_2 \cdot V_s = \int_{T_2}^{T_3} C_s \cdot dT \cdot V_s,$$

where $T_3$ satisfies the integral.

5. Isothermal Demagnetization: H, now at $H_3$, is decreased to $H_1$ by reducing the applied magnetic field in the case of a generator, or movement to lower magnetic field in the case of a motor. In the former, energy out is: $(H_3^2 - H_1^2)/8\pi \cdot (V_\omega + V_s)$, whereas in the latter, energy out is: $(H_3^2 - H_1^2)/8\pi \cdot V_s$. Variation in the magnetic field is at a rate so as to retain the superconductive phase, per Step 6.

6. Isomagnetic Heating: The superconductive Segment is subjected to heat flow from a higher temperature region or reservoir until $T_1$ is attained. The amount of heat energy, Q, is defined by:

$$\int_{T_3}^{T_1} C_s \cdot dT \cdot V_s.$$

Upon completion of heating, adiabatics is returned, and all initial conditions obtain Summary:
 Generator:  Net Work:
 $(H_2^2 - H_3^2 + H_3^2 - H_1^2)/8\pi \cdot (V_\omega + V_s) - (H_2^2 - H_1^2)/8\pi \cdot V_\omega$ (out)

Net Heat: $\int_{T_3}^{T_1} C_s \cdot dT \cdot V_s$ (in)

Motor: Net Work: $(H_2^2 - H_3^2 + H_3^2 - H_1^2)/8\pi \cdot V_s$ (out)

Net Heat: $\int_{T_3}^{T_1} C_s \cdot dT \cdot V_s$ (in)

Net heat in equals net work out.

Steps 1 and 2 may be combined to adduce an infinitely close process to the phase space boundary between normal and superconductive phase, while always on the normal side. Steps 3, 4, 5, and 6 may be combined to adduce an infinitely close process to the phase space boundary between normal and superconductive phase, while always on the superconductive side. In either case, owing to coherency in the electrons, change in H may be instantaneous from one value to the next, allowing for flux expulsion relaxation time.

Variation in Thermodynamic Variables During the Process Cycle:

FIGS. 3-10 are based upon processes conducted on tin. Other suitable superconductors will yield similar results. Cycles represented have $T_1=0.6T_c$, $T_2=0.186T_c$, and $T_3=0.401T_c$.

FIG. 3 exemplifies the phase space representation of the foregoing thermodynamic description.

FIG. 4 shows the variation in internal energy during the Cycle. Steps 1 and 2 are shown by the line A-B, which is constant because no energy enters or leaves the Segment. Steps 3 and 4 are indicated by curve B-C. Here the internal energy is reduced because the Segment is doing magnetic work. Steps 5 and 6 are represented by curve C-A, which shows the effect of both magnetic work performance and heat energies input.

FIG. 5 shows the crystal lattice portion only of the entropy as a function of lattice temperature. Such entropy is entirely independent of the phase state of the Segment.

FIG. 10 indicates the apportionment of the conduction electrons to the normal and superconductive regimes (or consitutencies) during the Cycle. At point A the Cycle commences in the superconductive phase where at $T_1$, 62.71 percent of the conduction electrons are superconductive. This assignment continues until adiabatic porcesses cease at $T_2$, which is point B, whereat all electrons are normal by definition, which is indicated by line B-C, specifically, point C. As the temperature of the Segment increases during Steps 3, 4, 5, and 6, the assignment of conduction electrons as superelectrons is first given by line C-D upon phase variation and then decreases as a characteristic of Segment (lattice) temperature approaching $T_1$, indicated by curve D-A. This figure indicates only assigned numerical apportionment, as based upon the entropy of phase, not energies apportionment.

FIG. 6 is a graph of the entropy of the normal portion only of the conduction electrons, per assignment indicated in FIG. 10, as a function of lattice temperature. Cycle commences at point A. Line A-B represents entropy variation during Steps 1 and 2. Phase variation at $T_2$ is indicated by line B-C which occurs because of a new assignment of electrons as superelectrons, per FIG. 10. Steps 3 and 4 are represented by curve C-D, and Steps 5 and 6 are represented by curve D-A.

FIG. 7 is a graph of the entropy assigned to the superelectrons, per assignment indicated in FIG. 10, as a function of lattice temperature. Cycle commences at point A, whereat because the superelectrons are entirely condensed, there is no entropy. Line A-B represents the entropy while the superelectrons have a quantum mechanical condensation below the zero of entropy. At point B, the quantum mechanical condensation energy has been supplied to the superelectrons. Curve B-C represents the increase in entropy of the superelectrons as they approach the entropy of the lattice, which happens at $T_2$, point C. The foregoing represents Steps 1 and 2. Phase variation at $T_2$ is indicated by a new assignment of electrons as superelectrons (different from $T_1$), though actually their entropy is initially that of normal electrons at $T_2$. Steps 3 and 4 are represented by curve D-E and line E-F. Curve D-E represents the loss in entropy as superelectrons give up the entropy of the normal phase towards the zero entropy of the superconductive phase, which event has concluded at point E. Line E-F represents the zero entropy of the superelectrons, while attendantly the energy gap (quantum mechanical condensation) is establishing, which is complete at point F. Line F-A represents Steps 5 and 6, indicating the zero entropy of the superconductive phase.

FIG. 8 shows the change in entropy of the Segment as a function of lattice temperature during the Cycle. At point A, phase is superconductive. When phase changes to normal, the superconductive portion of the conduction electrons absorb heat from the lattice and normal portion of the conduction electrons. Curve A-B results as the superconductive portion of the electrons gain energy which goes directly to satisfy the energy gap, and is all quantum mechanical in nature. This effects to lower the Segment entropy. At point B, the superconductive portion of the electrons are at zero entropy. Curve B-C results when the superconductive portion of the electrons gain entropy at the expense of the lattice and normal portion of the electrons (by assignment indicated in FIG. 10). This raises the total entropy until at point C, the temperature and entropy are volumetrically homogeneous in the Segment. Now at point C, the phase is normal. Phase is then induced to transform to superconductive. The electrons that at this temperature must become superconductive can only do so by giving up entropy and energy gap quantum mechanical energy. Curve C-D results when the conduction electrons that are transforming (per FIG. 10) into superelectrons loose entropy to the lattice and normal portion of the conduction electrons. This process creates a net ordering in the Segment, resulting in a decrease in entropy. At point D, the entropy of the superelectrons (as apportioned to this new temperature, per FIG. 10) is zero. Now, as energy is given up in establishing the energy gap no further order is registered by the superelectrons, but the lattice and assigned normal, only, portion of the conduction electrons absorb this energy as an increase in entropy, resulting in a net increase for the Segment, and curve D-E results. At point E, the superconductive phase is complete. To complete the Cycle heat is introduced and curve E-A results.

FIG. 9 is a graph of the temperature of the superelectons versus the lattice temperature for the Cycle. Steps 1 and 2 are represented by line A-B and curve B-C. Line A-B indicates zero entropy, while curve B-C indicates the superelectrons are gaining finite entropy. Steps 3 and 4 are represented by curve C-D and line D-E. Curve C-D indicates a loss in finite entropy, while line D-E indicates zero entropy. Steps 5 and 6 are represented by line E-A where zero entropy occurs for the superelectons.

B. Coherent Magneto-Caloric Demagnetization

Refer to FIG. 11, regarding the following process steps.

1. Isothermal Adiabatic Demagnetization: Phase varies from normal to superconductive, first evidenced by a change in magnetization of the segment to diamagnetic, with a latent heat of heating to $T_1$ resulting, via application of $H=H_1-dH$ at $T_1$. H is decreased to $H_2$, which is defined by $T_2$ in Step 2. Energy removed from the field in the case of a generator is: $(H_1^2-H_2^2)/8\pi \cdot (V_\omega+V_s)$. In the case of a motor work is adduced via movement of the superconductive diamagnet from $H_1$ to $H_2$ as: $(H_1^2-H_2^2)/8\pi \cdot V_s$. The rate of change of field is such as to always maintain the superconductive phase, per temperature variation in Step 2.

2. Isomagnetic Adiabatic Heating: The latent heat of $T_1$, $LH_1$, causes the Segment to heat as the volume heat capacity absorbs the difference in phase entropy energy at $T_1$. The final high temperature attained, $T_2$, is defined by:

$$LH_2 = \int_{T_1}^{T_2} C_s \cdot dT \cdot V_s,$$

where $T_2$ satisfies the integral.

3. Isothermal Adiabatic Magnetization: At $T_2$, phase is caused to vary from superconductive to normal, which is first evidenced by a change in magnetization of the segment to non-magnetic, by increasing H so that $H = H_2 + dH$. H is increased to $H_3$, defined by $T_3$ in Step 4. Energy added to the field due to increase in intensity, in the case of a generator is: $(H_3^2 - H_2^2)/8\pi \cdot V_\omega$. In the case of a motor, the absence of diamagnetism in the superconductor admits no work involvement in the relative motion to higher field. The rate of change of field is such as to retain the normal phase, while temperature changes due to Step 4.

4. Isomagnetic Adiabatic Cooling: The latent heat of cooling of $T_2$, $LH_2$, will evolve upon phase variation in Step 3, where $T_2 < T_c$. This difference in entropies of phase energy will be supplied by the volume normal heat capacity, adducing a final low temperature of $T_3$, as:

$$LH_2 = \int_{T_2}^{T_3} C_n \cdot dT \cdot V_s,$$

where $T_3$ satisfies the integral.

5. Isomagnetic Heating: The Segment is subjected to heat flow from a higher temperature region or reservoir until $T_1$ is attained. The amount of energy, Q, is defined by:

$$Q = \int_{T_3}^{T_1} C_n \cdot dT \cdot V_s.$$

6. Isothermal Demagnetization: H, now at $H_3$, is decreased to $H_1$ by reducing the magnetic field in the case of a generator, or movement to lower field in the case of a motor embodiment. In the former, energy out is: $(H_3^2 - H_1^2)/8\pi \cdot V_\omega$, whereas in the latter work is not involved in moving the non-magnetic Segment relative to a variable field value. The rate of change of field is such as to retain the normal phase, per the rate of change of temperature in Step 5. Upon completion of Demagnetization, adiabatics is returned, and all initial conditions obtain.

Summary:
Generator: Net Work: $(H_1^2 - H_2^2)/8\pi \cdot (V_\omega + V_s) - (H_3^2 - H_2^2)/8\pi \cdot V_\omega + (H_3^2 - H_1^2)/8\pi \cdot V_\omega$ (out)

Net Heat: $\int_{T_2}^{T_1} C_n \cdot dT \cdot V_s$ (in)

Motor: Net Work: $(H_1^2 - H_2^2)/8\pi \cdot V_s$ (out)

Net Heat: $\int_{T_2}^{T_1} C_n \cdot dT \cdot V_s$ (in)

Net Heat in equals net work out.

Steps 1 and 2 may be combined, as may Steps 3, 4, 5, and 6, per the discussion concerning the Magnetization Cycle, supra. Variation in field may be as described therein, also.

Variation in Thermodynamic Variables During the Process Cycle:

FIGS. 11–18 are based upon processes conducted on tin. Other suitable superconductors will yield similar results. Cycles represented have $T_1 = 0.6 T_c$, $T_2 = 0.745 T_c$, and $T_3 = 0.546 T_c$.

FIG. 11 exemplifies the phase space representation of the foregoing thermodynamic description.

FIG. 12 shows the variation in internal energy during the Cycle. Steps 1 and 2 are shown by curve A-B, where there is a reduction in free energy due to magnetic work performance by the Segment. Steps 3 and 4 are represented by line B-C. Here the free energy is constant because no energy enters or leaves the Segment. Steps 5 and 6 are represented by curve C-A, where there is an increase in internal energy due to heat entering from an external heat reservoir.

FIG. 13 shows the lattice portion only of the entropy as a function of lattice temperature. Such entropy is entirely independent of the phase state of the Segment.

FIG. 18 indicates the apportionment of the conduction electrons to the superconductive and normal regimes during the Cycle. With line E-A the Cycle commences with variation in phase from normal to superconducting, whereat at $T_1$, 62.71 percent of the conduction electrons are defined as superelectrons. This assignment varies with lattice temperature and results in curve A-B. At point B, $T_2$ is established with 43.8 percent of the conduction electrons assigned as superelectrons. The foregoing describes Steps 1 and 2. Steps 3 and 4 are described by line B-C during which phase variation back to normal has transpired at point B, with the assignment being defined by the value thereat. With the conclusion of Steps 3 and 4, the Segment is normal, so by definition assignment of a portion of the electrons as superelectrons ceases, indicated by line C-D. Steps 5 and 6 are indicated by line D-E in which no superelectrons exits.

FIG. 14 is a graph of the entropy of the normal portion only of the conduction electrons, per assignment indicated in FIG. 18, as a function of lattice temperature. Cycle commences at point A with the normal phase. Assignment of 37.29 percent of the conduction electrons to superelectrons revalues the total entropy of the normal regime remaining to that of point B. Steps 1 and 2 are indicated by curve B-C, where the percentage of electrons assigned as superelectrons varies with temperature. Thus, at point C, the assignment of superelectrons is correct and there is no discontinuity due to reassignment, although phase now varies to normalcy. The assignment of electrons is constant, per FIG. 18, and line C-D results for Steps 3 and 4. At point D the normal phase is complete so that no assignment to superelectrons is appropriate; this causes the assignment at point C to return to the normal regime at point D, causing line D-E to result. Steps 5 and 6 are indicated by line E-A.

FIG. 15 is a graph of the entropy assigned to the superelectrons, per assignment indicated in FIG. 18, as a function of lattice temperature. Cycle commences with line A-B due to assignment of 62.71 percent of conduction electrons as superelectrons at point B. Steps 1 and 2 are represented by curve B-C and line C-D, whereby normal electrons assigned as superelectrons loose entropy until at point C the zero of entropy is attained. Line C-D represents the continuation of Steps 1 and 2 during which the quantum mechanical energy gap below the zero of entropy is established in the superelectrons, completing at point D. Steps 3 and 4 are represented by line D-E and curve E-F. Line D-E is indicative of the superelectrons having zero entropy, but with the quantum mechanical energy being eliminated as they normalize. At point E the zero of entropy is established and from point E to point F entropy is raised to that of the normal electrons and lattice. This is established at point F. Reassignment of electrons, per FIG. 18, causes the line F-G. Steps 5 and 6 are represented by line G-A, during which no superelectrons exist.

FIG. 16 shows the change in entropy of the Segment as a function of lattice temperature during the Cycle. At point A, phase is normal. When phase changes to superconductive, as per the description for FIG. 8, first the conduction electrons becoming superelectrons give up entropy, thus resulting in curve A-B, then give up energy gap quantum mechanical energy, which effects to raise the Segmental entropy along curve B-C. At point C the superconductive phase is complete. At point C, now the normal phase is induced. As per the description for FIG. 8, first the superelectrons gain energy by filling the energy gap, resulting in curve C-D, then the superelectrons conclude becoming normal by accepting finite entropy from the lattice and normal portion of the conduction electrons, along curve D-E. The Cycle is completed by introducing heat resulting in curve E-A.

FIG. 17 is a graph of the temperature of the superelectrons versus the lattice temperature for the Cycle. Steps 1 and 2 are represented by curve A-B and line B-C. Curve A-B indicates loss in entropy while line B-C indicates zero entropy for the superelectrons. Steps 3 and 4 are represented by line C-D and curve D-E. Line C-D indicates zero entropy while curve D-E indicates an increase in entropy for the superelectrons. Steps 5 and 6 are represented by line E-A, indicating an increase in entropy for the superelectrons as heat enters from the external heat reservoir. Note that line E-A represents a portion of now all normal electrons that were assigned as superelectrons at $T_2$.

C. Enhanced Coherent Magneto-Caloric Demagnetization

Refer to FIG. 19, regarding the following process steps.

The Demagnetization Cycle described above expected that all heats transfer from external environs would enter during Step 5, above. In fact, the Demagnetization Cycle enjoys the unique ability to admit heats transfer during any and all parts of the Cycle. Continuous self-cooling can be attained when external heats transfer is continuously operative (including losses heating and cryogenics heat leakage). Heat transfer during Steps 1 and 2, above, enhances the final high temperature Cycle value, since now $$\int_{T_1}^{T_2} C_s \cdot dT \cdot V_s = LH_1 \cdot V_s + Q',$$

where $Q'$ is the heat transfer during Steps 1 and 2, and where $Q''$ is the heat transfer during Steps 3, 4, 5, and 6. When $Q = Q''$ then the above Demagnetization Cycle is operative. When $Q = Q' + Q''$ and $Q' \neq 0$, then $T_2$ is enhanced to a higher value, designated as $T_2'$, where $T_2' > T_2$, and $$LH_1 \cdot V_s + Q' = \int_{T_1}^{T_2'} C_s \cdot dT \cdot V_s.$$

Now, this result also enhances Q since $$Q' + Q'' > \int_{T_3}^{T_1} C_n \cdot dT \cdot V_s,$$

and this enhancement has a consequence of increasing the work out similarly, since $W = (H_1^2 - H_2'^2)/8\pi \cdot V_s$, where $H_2'$ is the critical field at $T_2'$. The enhancements on the work and heat are identical, so that heat in equals work out, but values exceed those in the Demagnetization exposition above. In any case, possibilities of Cycle are: $Q''$ equal to Q, with $Q' = 0$, in which case the Demagnetization Cycle above obtains; $Q''$ and $Q'$ both not equal to zero and $Q'' + Q'$ equal to Q, in which case continuous self-cooling obtains; the final case is where $Q'' = 0$ and $Q' = Q$, in which event the enhancement is a maximum and largest energy conversion during Cycle is possible. For the adiabatic restraint to operate in Steps 2 and 4, below, per latent heats, what must be assured is that at all times the external temperature of the region transferring heat into the Segment exceeds the Segment in-process temperature. That is, it must be assured that heat flows only into the Segment, not out of it at any time, for the cycle to be maximally energy convertive.

The general case where $Q' \neq 0$ and $Q'' \neq 0$ will be reported:

1. Isothermal Demagnetization: Steps as in B.1, above. However, now H will decrease to $H_2'$, and the energies for the generator and motor will be respectively: $(H_1^2 - H_2'^2)/8\pi \cdot (V_\omega + V_s)$ and $(H_1^2 - H_2'^2)/8\pi \cdot V_s$.

2. Isomagnetic Heating: In addition to $LH_1$, $Q'$ will enter, so that $T_2'$ is defined by:

$$LH_1 \cdot V_s + Q' = \int_{T_1}^{T_2'} C_s \cdot dT \cdot V_s.$$

3. Isothermal Magnetization: Steps as in B.3, above. However, now, H will increase to only $H_1$. This is because $Q''$ will enter during Step 4, following, and admit only an increase of T to $T_1$. Generator energy input will now be $(H_1^2 - H_2'^2)/8\pi \cdot V_\omega$. Motor work will continue at zero, as the Segment is non-magnetic.

4. Isomagnetic Cooling: In addition to $LH_2'$, which is the latent heat evolved at $T_2'$, of cooling, is the heat transfer of $Q''$, which contributes a heating. The value of $Q''$ is determined by:

$$LH_2' \cdot V_s - Q'' = \int_{T_2'}^{T_1} C_n \cdot dT \cdot V_s.$$

With the attainment of $T_1$, all the conditions at the start of the Cycle obtain.

Summary:

Generator: Net Work: $(H_1^2-H_2'^2)/8\pi \cdot (V_\omega + V_s) - (H_1^2-H_2'^2)/8\pi \cdot V_\omega$ (out)

Net Heat: $\int_{T_2'}^{T_1} C_n \cdot dT \cdot V_s - LH_2' \cdot V_s - Q'$ (in)

Motor: Net Work: $(H_1^2-H_2'^2)/8\pi \cdot V_s$ (out)

Net Heat: $\int_{T_2'}^{T_1} C_n \cdot dT \cdot V_s - LH_2' \cdot V_s - Q'$ (in)

Net heat in equals net work out.

In the case of the maximum enhancement cycle, where $Q''=0$ and $Q'=Q$, then $T_2'$ may be found as follows:

$$LH_1 \cdot V_s + Q' = \int_{T_1}^{T_2'} C_s \cdot dT \cdot V_s \text{ and}$$

$$LH_2' \cdot V_s = \int_{T_2'}^{T_1} C_n \cdot dT \cdot V_s.$$

Comments at the end of the Demagnetization Cycle are applicable to the Enhanced Demagnetization Cycle, regarding combination of steps and field variation.

FIG. 20 indicates the work conversion in units of $H_o^2/8\pi$ as a function of $Q'$ for a process Cycle performed on tin with $T_1$ of $0.6T_c$. Other suitable superconductors will yield similar results. Note that when $Q'=0$, the Demagnetization Cycle obtains; when $Q'=0.246H_c^2/8\pi$ ergs/cc., the maximum Enhanced Demagnetization Cycle results.

In closing, it should be noted that the Demagnetization Cycle can also be operated with Steps 5 and 6 eliminated via the use of concurrent heating from an external reservoir with latent heat cooling of $T_2$, essentially as was done in the Enhanced Demagnetization Cycle.

D. Thermosynthetic Energy Output Expectancies

The materials preceding these address the various circumstances unique to Coherent Magneto-Calorics. In this present review, the result of those circumstances will be determined.

The end-point cycle temperatures, $T_1$ and $T_2$, define the field cycling as: $H_1$ to $H_2$ to $H_1$. Work out is performed during the superconductive phase of the Cycle, from higher to lower field. Work out per Cycle is, then, $(H_H^2-H_L^2)/8\pi \cdot V_s$, where $H_H$ is the higher, and $H_L$ the lower of $H_1$ and $H_2$, depending on whether the process is a Magnetization or Demagnetization.

It is assumed that the entire Envelopment cycles in one complete passage through $T_1$ to $T_2$ to $T_1$. Such cyclical events are called "Transmogrific Periods", while the magnetization variation event takes place at the "Transmogrification Point", or "T.P.", (for which there are two per Transmogrific Period). The energy output per revolution, in the case of a motor embodiment is then: $N_T \cdot N_s \cdot (H_H^2-H_L^2)/8\pi \cdot V_s$ ergs, where $N_T$ is the number of Transmogrific Periods and $N_s$ the number of Segments. For a generator embodiment, it is appropriate to simply define one Transmogrific Period for the whole of the Envelopment, in which case, the energy output is then: $N_s \cdot (H_H^2-H_L^2)/8\pi \cdot V_s$ ergs. (In the event of a relative motion generator embodiment, then the description for the motor obtains.) $N_s$ may be estimated to be about $10^{15}$ Segments per cubic centimeter, assuming a diameter of $10^{-5}$ cm. for each, without allowance for insulation or assembly, which will be discussed later.

Now, in order to derive an expression for power, the time to complete one cycle is needed. Switch-time for the phase transition and heat transfer processes, together with Joule heating effects, will be limiting factors. A reasonable time on cycling is $10^{-4}$ seconds. Thus, the entire Envelopment can be cycled in this time also.

It may be assumed that a reasonable Segment superconductor density of one-quarter the engine volume obtains. This allows for insulation and assembly components. Therefore derivable energy is: $0.25 \cdot (H_H^2-H_L^2)8\pi \cdot V_E$, where $V_E$ is defined as the engine volume in cubic centimeters.

Since the critical fields involved are on the order of 500 gauss, and the maximum Thermosynthetic Cycle energies conversion provides only about $0.5 \cdot (H_c^2)/8\pi \cdot V_s$, the expectancy of energies derivation is: $Q=W=0.125 \cdot (500)^2/8\pi$ ergs/cubic centimeter per Transmogrific Period. Now, the effective switch-time is based upon that necessary to cycle one Transmogrific Period, so that the energy conversion expectancy per second is, therefore, $W/t=P=1.24\times 10^6$ Watts/cubic centimeter=47 Horse Power/cubic foot of engine volume (as a representative approximation). Because of the nature of the switch-time constraint, the power density is independent of the number of Transmogrific Periods utilized in an embodiment scheme, although the torque will be incremented. The torque is given by: $N_T(H_H^2-H_L^2)/8\pi \cdot A \cdot L$, where A is the cross-sectional area of the Envelopment at the Transmogrification Point, and where L is the length of the average lever arm.

FIGS. 23 and 24 are graphs showing how the maximum expected energy conversion per cycle is affected by selection of the starting temperature, $T_1$. In both graphs tin is used as a representative superconductor. FIG. 23 shows the result for a Magnetization Cycle, curve W, while FIG. 24 shows the result for a Demagnetization Cycle, curve W'. Temperature is in reduced units; energy is in $H_o^2/8\pi$ ergs per cubic centimeter. As a consequence of operating the Cycle close to the absolute zero of temperature, the cooling latent heat may exceed the heat capacity of the normal portion of the Segment. This may result in the quantum mechanical energy gap not being entirely filled at absolute zero, although the Segment is magnetically normal. Such an event is said to involve a "Zero-Point Quantum Mechanical Energy Deficiency", or "Zeped", which is numerically equal to the energy gap not yet filled. Heat transfer from the HeaTraP must satisfy this requisite energy in order to complete the cycle in the usual way. The amount of Zeped is starting temperature dependent, and is indicated by curve Z and Z' in FIGS. 23 and 24 respectively. The appearance of a Zeped will lower the Meissner Effect energy to eject the magnetic field by an equal amount below $H_o^2/8\pi$. It should also be noted that the effective critical magnetic field during the phase transition may be less than the usual (which was assumed in the discussion of the cyclic options) if the energy gap available for Meissner Effect work is less than that needed to eject the flux. This can happen at absolute zero in the event a Zeped is present. In such a case the operative critical field will be defined by $H_c^2/8\pi = H_o^2/8\pi -$ Zeped energy; this will obtain until the Zeped energy is supplied magnetically or thermally. Note that for different superconductors the shapes of the curves will vary, as will the location of maxima.

The rate at which losses can be acceptable depend upon the nature of the origin of the loss and the type of Cycle being utilized. Joule heating can be expected to generate waste heat while attendantly reducing magnetic work (as a reduction in work is translated into heat generation). Heat leak associated with cryogenics can in large measure be treated as merely a form of HeaTraP, when its rate is expected and channelable. Failure of adiabatic integrity will limit final temperature extrema, with consequent reduction in Cycle work output. The Magnetization Cycle is sensitive to heating between $T_1$ to $T_2$, whereas, the Demagnetization Cycle is not, within limits.

Joule heating will reduce the output work of either Cycle option by the amount of its generation. The Magnetization Cycle cannot accept heat during $T_1$ to $T_2$, unless a Zeped exists, but can cool components so heated between $T_2$ to $T_1$. The Demagnetization Cycle can cool at all times. Obviously, the amount of such loss must be less than the latent heat of cooling, or else a self-cooling condition is absent.

Heat leak is inevitable, but not necessarily a problem if anticipated. The Demagnetization Cycle can cool components so affected continuously. The Magnetization Cycle must be adiabatic from $T_1$ to $T_2$, unless a Zeped exists, but can cool components from $T_2$ to $T_1$. If heat leak is below the heat associated with the specific heat of phase integral from $T_3$ to $T_1$ it can be absorbed. Thus, HeaTraP is reduced by the same amount, output work being unaffected.

A variant but related problem to that of heat leak is failure of perfect adiabatic conditions during the phase transition latent heat evolution of cooling. Especially sensitive is the Magnetization Cycle process from $T_1$ to $T_2$, where any reduction in adiabatics will increase $T_2$, unless a Zeped exists. FIG. 22 is a graph of the amount of heat transfer during such a process in units of $H_o^2/8\pi$ ergs per cubic centimeter versus percentage remaining of the maximum energy conversion Thermosynthesis, where $T_1$ equals $0.6T_c$ for tin. (This being a representative example.) The curve continues until $T_3$ is greater than $T_1$, whereat energy is necessary to be delivered to refrigerate the Segment to $T_1$.

Hysteresis in the critical field of transition has two consequent effects upon the Cycle: (1) reduction in the work of output because the high field, $H_H$, is lowered to the supercooling field, $H_{sc}$, while the low field, $H_L$, is raised to the superheating field, $H_{sh}$, and (2) production of heat the value of which is determined by the variation in field energy at transition due to hysteresis. The cooling latent heat will be reduced by an amount determined by the heat generated at the transition. Again, the Magnetization Cycle will be sensitive during the process between $T_1$ to $T_2$ unless a Zeped exists. FIG. 25 is a graph of the increase in hysteresis field over the non-hysteresis critical field for such process in units of $H/H_c$ versus percentage remaining of the maximum energy conversion Thermosynthesis, where $T_1$ equals $0.6T_c$ for tin. (This being a representative example.) Ultimately, failure of the Cycle will result when $H_{sh}$ equals $H_{sc}$.

An additional affection on output expectancies arises when the applied magnetic field is not varied fast enough, per $dT/dt$, or is held constant at some intermediate value between the critical fields at the starting and ending temperatures for the particular process. In absence of magnetic hysteresis, the critical magnetic field is that determined by the Tuyn Curve per the lattice (lattice and normal portion of the conduction electrons) temperature. In the event the Segment lattice temperature crosses the Tuyn Curve while in-process, retransition to former phase will result, albeit with a reduced free energy separation in the conduction electrons as based on the present energy of the superelectrons, and oscillations of phase, in the event of a steady applied field, can thereafter be expected as temperature variations cause repeated Tuyn Curve crossings. In the presence of field hysteresis, a retransition of phase would not be expected until the lattice temperature rendered the present applied field as the appropriate hysteresis field for transition; hence, expected would be oscillations of phase ranging over temperatures indicative of the supercooling and superheating fields, or else attainment of a state of equilibrium, in the event of a steady applied magnetic field value. Accordingly, the applied magnetic field in all above processes should vary at least as fast as the temperature, per the Tuyn Curve, in order to retain appropriate phase and assure cyclic extrema attainment.

Per the Lutes-Maxwell experiment cited above, it is clear that for a coherently sized Segment, demagnetization effects due to shape or field orientation will not render an advent of the intermediate state, rather, transition will be accomplished suddenly when the magnetodynamic energy of exclusion equals $H_{cT}^2/8\pi \cdot V_s$. Hence, in the following description any shape Segment is contemplated, but the particular critical field value may accordingly adjust, as happened in said experiment.

Finally, in the event any caloric process evidences concurrent with the variation in magnetization consequent upon phase change, energies conversion will diminish commensurately due to associated magnetic work losses. Also, any time necessary for change in ordering of the superelectrons at magnetization variation which effects to retard the event must occur at constant applied magnetic field lest work be done against the superconductor, or lost from the superconductor, in the course of the Cycle.

BRIEF DESCRIPTION OF THE DRAWINGS

FIGS. 21, 22 and 25 are graphs of percent Thermosynthesis versus, respectively, increasing Segment diameter, heat transfer during adiabatic processes, and hysteresis in the critical magnetic field.

FIGS. 26 and 27 show phase commutation designs.

FIGS. 28 through 31 relate to understanding and controlling hysteresis effects in the phase transition.

DESCRIPTION OF THE PREFERRED HEAT ENGINES

Figure 1:
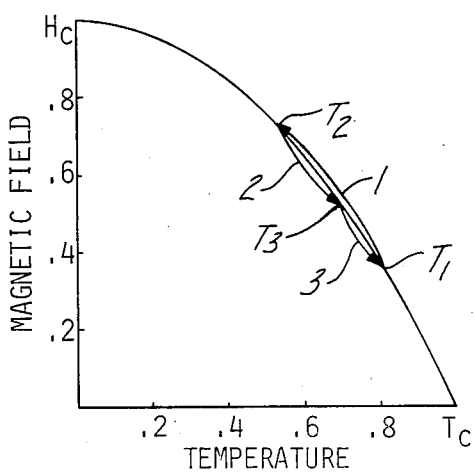
FIG. 1 depicts the basic cyclic process for a Magnetization Cycle.
Figure 2:
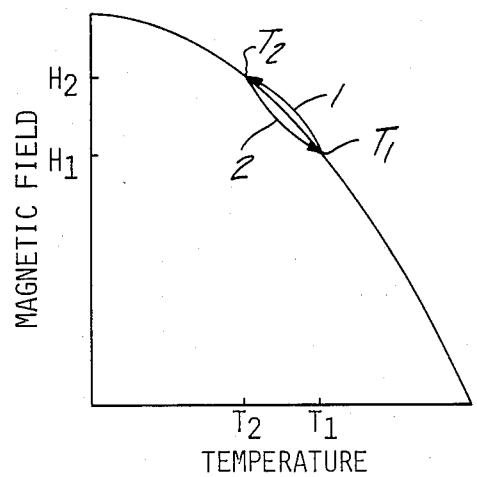
FIG. 2 indicates a conventional superconductive heat engine cycle.
Figure 3:
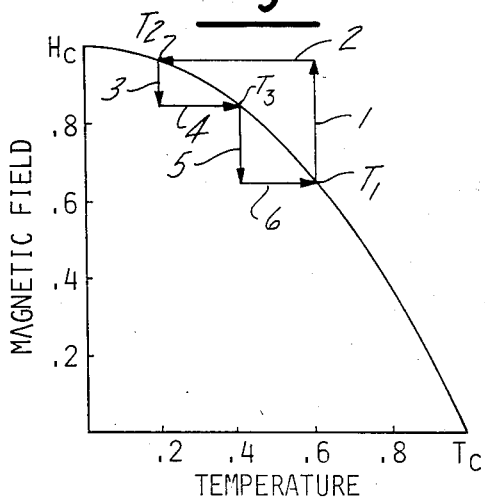
FIGS. 3 through 19 show the thermodynamic variables during cyclic steps contemplated in this invention.
Figure 4:
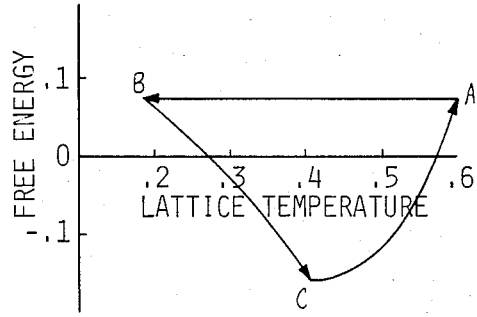
Figure 5:
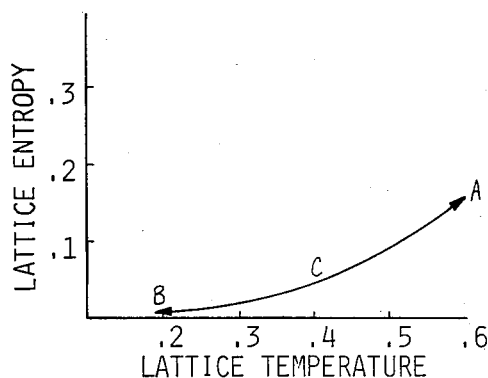
Figure 6:
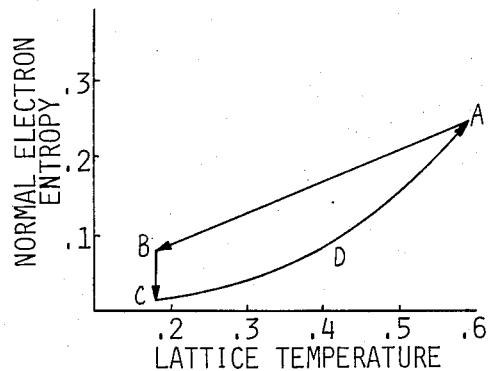
Figure 7:
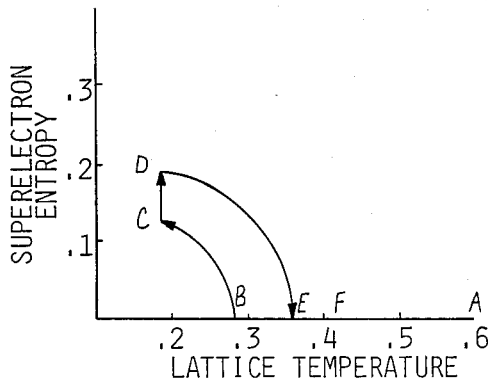
Figure 8:
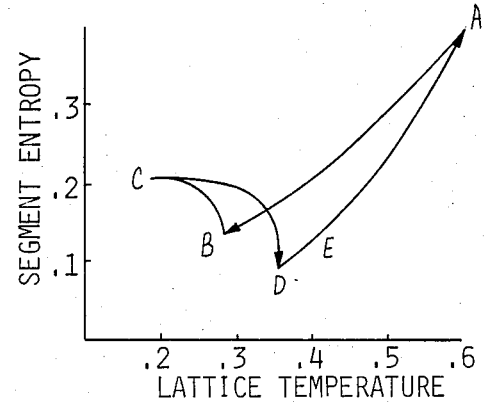
Figure 9:
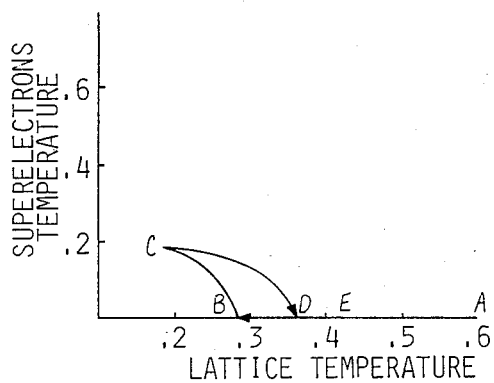
Figure 10:
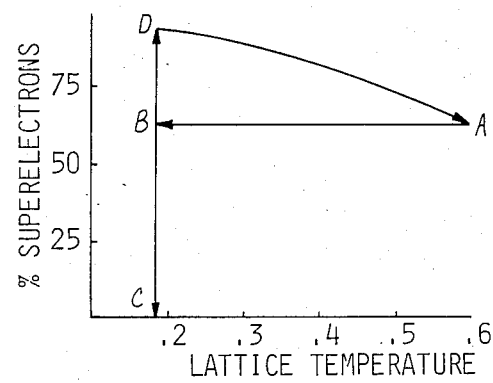
Figure 11:
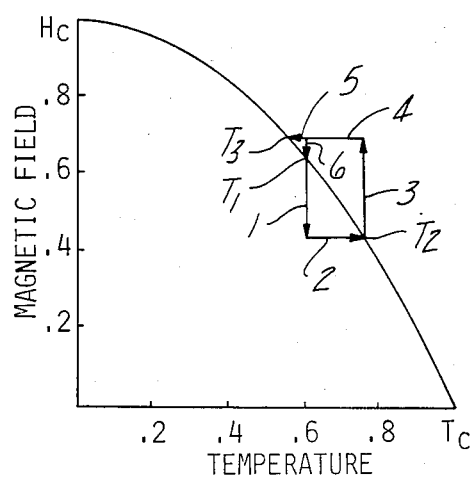
Figure 12:
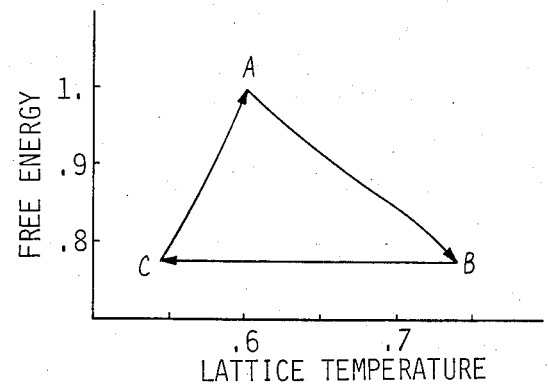
Figure 13:
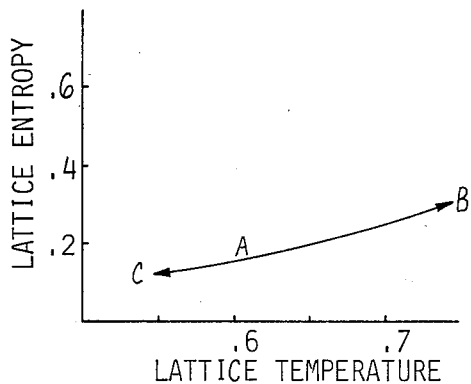
Figure 14:
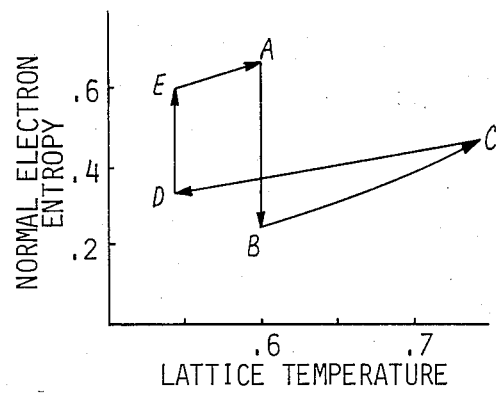
Figure 15:
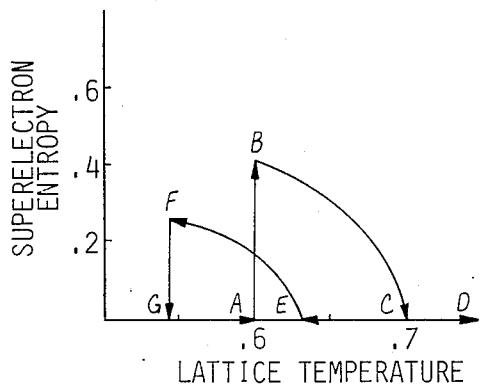
Figure 16:
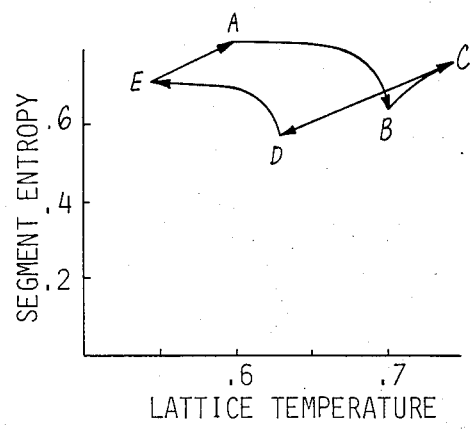
Figure 17:
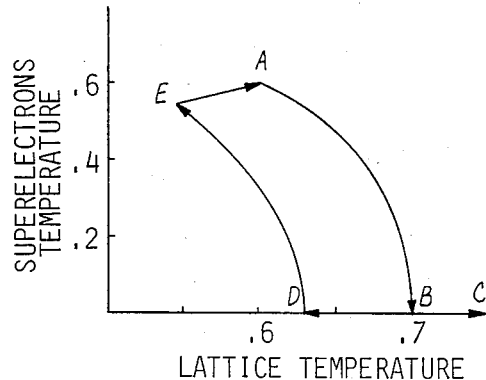
Figure 18:
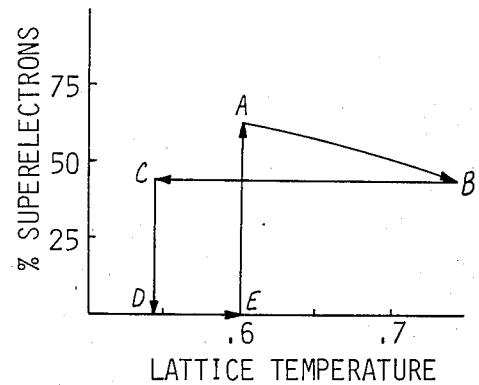
Figure 19:
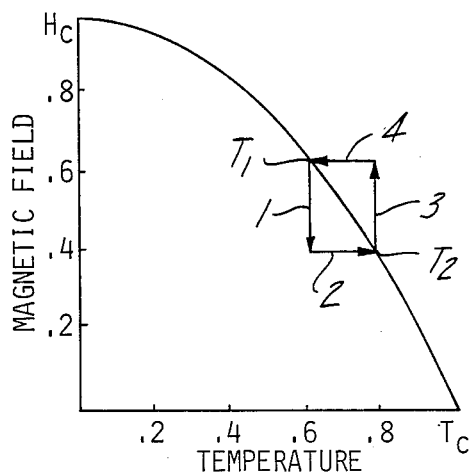
Figure 20:
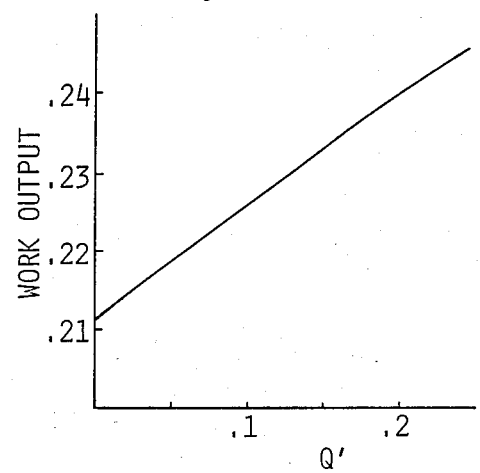
FIG. 20 is a graph of the enhancement in output work for the Demagnetization Cycle as a function of heat entry between $T_1$ and $T_2$.
Figure 21:
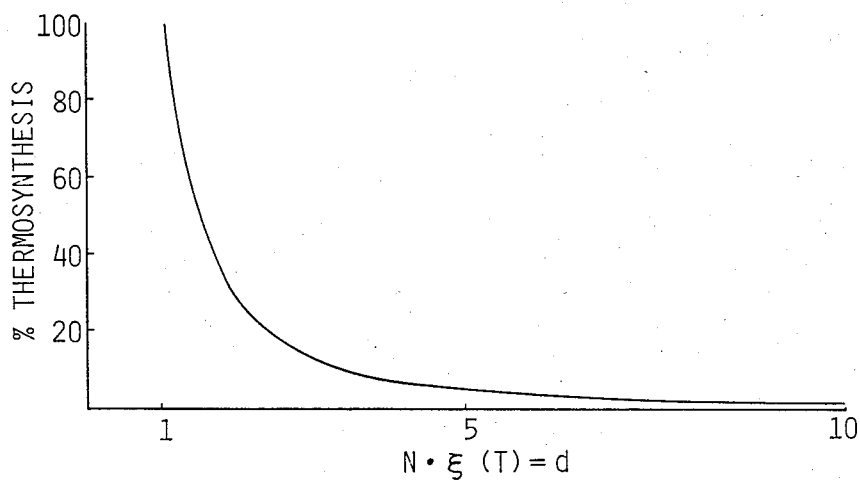
Figure 22:
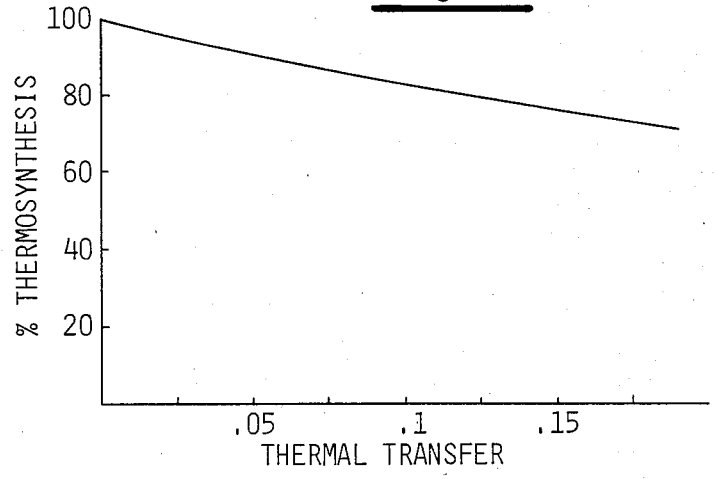
Figure 23:
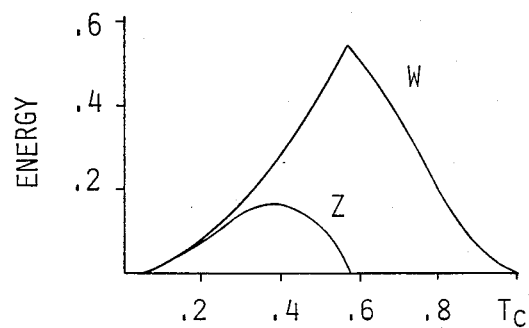
FIGS. 23, and 24 are graphs of cycle starting temperature versus, respectively, work output for the Magnetization and Demagnetization Cycles.
Figure 24:
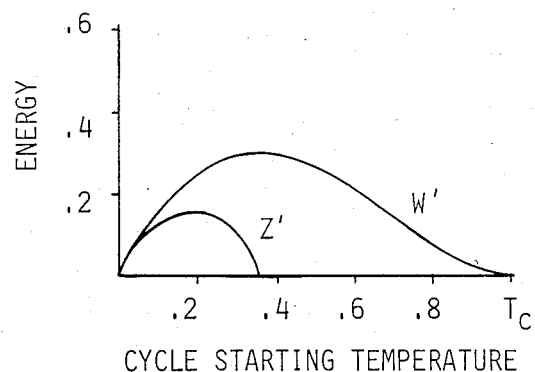

Whereas the essential subject of this invention is the cyclic process described, such Cycle imparts utility when it can be harnessed to deliver useful work. Work can be derived from the Cycle in one of two guises: mechanical energy or electrical energy, depending upon the means by which net field energy variation is registered as an output. In the former, the applied field, though steady, is spatially variant, so that motion of a coherent particle of superconductor (Segment) will experience field variation with movement. In the latter, the applied field may vary in time, obviating motion of the Segment. Each energy output form will be discussed separately, following, with inclusion of the following headings: (A) Magnetic Circuit, (B) Stator, (C) Rotor, (D) Commutation and Control of Hysteresis, (E) Power and Speed Control, (F) Heat Transfer Process, (G) Envelopmental Design, and (H) Energy Transfer Process. All Figures show components in relative placement; operational function may alter relative spacings and thicknesses.

I. Magnetic Striction-Mechanical Relaxation:

Motor Embodiment

(A) Magnetic Circuit

A steady magnetic field is established by use of either persistent electric currents in superconductive wire windings or permanent magnets, which varies spatially along the rotational direction of rotor revolution, varying from a maximum of $H_2$ to a minimum of $H_1$ for a magnetization process, and maximum of $H_1$ to a minimum of $H_2$ for a demagnetization process, defined by the critical temperatures operating in the chosen Cycle for the subject superconductor cycled such that: $T_1$ defines $H_1$ as the critical field thereat and $T_2$ defines $H_2$ as the critical field thereat. The rate of change of field spatially must be so effected as to ensure that the phase of the superconductor is always on the same side of the Tuyn Curve. The field is homogeneous and in width the same as the Envelopment component with its associated Transmissor. In a radial design, there may be more than one such field cycle from $H_1$ to $H_2$ to $H_1$, each of which designated as a "Transmogrific Period". Such field may be confined by superconductive sheet confinement channels as described in P. Cioffi, J. App. Phy., 33, 875 (1962), hereby incorporated by reference, and also employ ferromagnetic materials as a means to minimize the necessary energy to produce the field, per the constraint of Joule heat generations due to field intensity variations. The work space consists of the Envelopment whereat the cycling superconductive Segments are situate, the permeability of which is approximately that of vacuum.

(B) Stator

The stationary portion of the motor may consist either of the field production agencies or the cycling Envelopment constituents.

(C) Rotor

The rotating or moving portion of the motor may consist either of the field production agencies or the cycling Envelopment constituents.

(D) Commutation and Control of Hysteresis Effects

The transition of a Segment will result only when the cyclically mandated proper temperaturee and magnetic field are applied, as described previously.

The magnetic field must vary spatially such that preferably $dT/dt$ is less than $dH/dt$, that is, once phase variation has ensued, phase retention is assured if the field varies in time at least as fast as temperature varies in time, per the Tuyn Curve. This means that since the field intensity is a function of linear distance, that the time rate of motion of the Segment must be such as to retain the phase, also.

Additionally, when the cross-sectional area of the Envelopment is large, that is, many 'range of coherence' sized Segments are involved, then the phase transition of such cross-section, first evidenced by a magnetization variation, will involve an inhomogeneous affect on the excluded magnetic field. In order to avoid this, two steps may be taken, following:

A Transmissor is employed, which may be composed of a ferro-magnetic substance, the purpose of which is to serve as an alternative route for the magnetic circuit when the Segments are in the superconductive phase (the field passing through them when they are in the normal phase). The idea is to utilize a highly permeable Transmissor which will easily accept the flux density change when phase varies in the Envelopment, so that the field intensity variation on the Segment surfaces due to the Meissner Effect is minimized, while the field cross-section is also minimized.

FIG. 26 depicts such a commutation of phase scheme in which the arrangement at the Transmogrification Point is shown. The magnetic field is directed into (or out of) the paper. Segments in the superconductive phase (of diamagnetic magnetization) are labeled 2, while Segments in the normal phase (of non-magnetic magnetization) are labeled 1. The critical transition field obtains along the middle row of Segments whereat transition of phase is in process (hence, there is no phase label for these Segments). The high permeable material, 4, is placed on either side as a route for the excluded flux. In any phase, the field is of just the requisite value outside the Transmissor, 4. This is because the reluctance of the working space is much greater than that of the Transmissor, so that the Transmissor can easily accept the excluded flux without any change in the field intensity (in other words the Transmissor has a very large capacity to accept the excluded field). Flux confinement is provided by superconductive diamagnetic insulator sheet, 3. Direction of motion of the Segments is up or down the paper.

This result can also be accomplished by having a nearly infinite field cross-section relative to the Envelopment cross-section. This is of course the same effect as the high permeable material design, above. Either technique will reduce or eliminate any demagnetization due to constraint on the cross-sectional extent of the field.

The second means to control and properly secure phase commutation of the Envelopment Segments is to utilize a staggering of the placement of the Segments along the direction of motion across the cross-section, so that, at any one instant only one Segment varies in phase parallel to the cross-section, while attendantly, the superconductive channel defining the limits of the Transmissor is stair-stepped with cross-section permeability commensurate with Segment sizing.

FIG. 27 depicts such a commutation scheme in which the arrangement at the Transmogrification Point is as shown. The magnetic field is directed into (or out of) the paper. Phase of the Segments is as indicated as in FIG. 26, above, where 5 and 6 refers to normal and superconductive phase, respectively. The dashed lines indicate the precise location of the Transmogrification Point, whereat the field is just such as to induce phase variation. Only one Segment at one time is located thereat, and, hence, only one Segment at any one time undergoes phase transition. The Transmissor, 8, may be vacuum or permeable material, and its boundary, 7, is stairstepped at the Transmogrification Point, with composition as defined in FIG. 26, above. Motion of the Envelopment is up or down the paper.

The effect of the foregoing commutation schemes is to retain constant field intensity on the Segment surfaces cross-sectionally, i.e., the critical field is constant across the phase transition boundary point, or Transmogrification Point.

Hysteresis in the magnetic field of transition is discussed supra in regard to the nature of energy losses and its consequent effect upon the Cycle. The present concern shall be limited to means whereby reduction or elimination in the hysteretic field itself is accomplished, and/or "losses" associated therewith are channeled into some reversible process. While it is the case that hysteresis effects are not specifically included in the contemplation of the Coherent Magneto-Caloric Effect Cycle, the vagaries of such fields being generally such as to prevent any conclusive and reproducible prediction of their magnitude, it is, however, probable that some hysteresis will exhibit, and while such effect may not be of a sufficient order of magnitude to eclipse entirely any cyclic Thermosynthesis, it control or elimination is undeniably desirous. Because such controls are closely related to embodiment construction such details have been deferred to the present. There are several available means to control critical field hysteresis demands, which if unchecked, yield heat losses subtraction from theoretical maximum work output expectancies.

Following will be detailed several means to minimize the effects of hysteresis in the critical magnetic field of transition. These may be considered independently, or collectively, in any embodiment.

(a) Normal metal plating of the Segments can eliminate surface superconductivity, and, hence reduce hysteresis. See for instance Phy. Rev. 177, 763 (1969), hereby incorporated by reference.

(b) Operation of the Cycle near $T_c$ of the working superconductor will involve a minimum of hysteresis, possibly none. See for instance Phil. Mag. 43, 273 (1952), hereby incorporated by reference.

(c) Local affection of the ordering parameter causing an inducement to nucleation: pits, protuberances, and irregularities in shape and structure (inclusive of lattice dislocations and purity). Also local variance in the applied field will serve the same purpose (local meaning over a "small" portion of the surface of the Segment).

(d) Per the Lutes-Maxwell experiment on tin whiskers, Phy. Rev. 97, 1718 (1955), hereby incorporated by reference, the presence of a non-zero demagnetizing coefficient can cause the Segment to switch phase at a field lower than that of the thermodynamic critical. This is because no intermediate state is conceivable for coherently sized particles. This magnetic stress to transition can effectively contribute as a means to overcome the potential barrier, which is the basis for hysteresis. The larger the demagnetizing coefficient, the less hysteresis should exhibit.

(e) It is understood that hysteresis is the combined result of variation in the ordering parameter and diamagnetic exclusion energy yielding establishment of a potential barrier that must first be overcome before transition can occur. Assuming the former is constant given any particular physical geometry of a Segment, the latter can be adjusted by artificially redistributing the field intensity on the Segment surface. See FIG. 28. Here a spherical Segment, 9, is gien the diamagnetic potential of a thin cylinder parallel to the field, by use of field confinement channels of superconductive sheet, 10, while the ordering parameter is yet active according to the spherical geometry. The arrow shows the direction of the applied magnetic field. It is necessary to reduce the diamagnetic screening energy in order to reduce the hysteresis expectancy via reduction in the potential barrier to transition. See for instance Phil. Mag. 43, 273 (1952), hereby incorporated by reference.

(f) The basic event causing loss due to hysteresis is field energy wasted because it exceeds the Meissner Effect energy. Clearly, if the hysteresis field remains constant during phase variation, energy loss will be either:

$H_{cT}^2/8\pi - H_{sc}^2/8\pi$ or $H_{sh}^2/8\pi - H_{cT}^2/8\pi$.

If $H_{sh}$ or $H_{sc}$ vary during phase variation, the heat loss will definitely be affected. The ideal situation is for $H_{sh}$ to reduce to $H_{cT}$ and for $H_{sc}$ to increase to $H_{cT}$. The loss will then be minimized, while at the same time securing the necessary force to overcome the potential barrier. This can be accomplished by causing the spatial volume of the external applied field cross-section to be confined outside the Segmental volume such that: $H_{cT}/(A_T+A_p+A_M)=H_{sc}/(A_T+A_p)$ for the case of a demagnetization process and $H_{cT}/(A_T+A_p)=H_{sh}/(A_T+A_p+A_M)$ for the case of a magnetization process, where in either, $A_T$ is the cross-section of the Transmission normalized to vacuum permeability, $A_p$ is the cross-section of the field penetration zone into the superconductor, and $A_M$ is the cross-section of the fully diamagnetic volume of the Segment. There will not be a loss of energy to hysteresis effects if the energy of the field necessary to overcome the potential barrier is not lost to Joule heat in the superconductor in the case of a magnetization process or a reduction in the magnetic stress resulting in an increase in latent heat of heating in the case of a demagnetization process. Hence, what must be done is to cause the energies of the field just before phase variation to: (1) supply sufficient impetus to overcome the potential barrier, and (2) cause the change in cross-section of the field attendant upon phase variation to ensure that a work of $H_{cT}^2/8\pi$ is done by the superconductor. See FIG. 29.

(g) Finally, a very tightly wound superconductive wire coil about the Segment can be employed to adjust locally, in its interior, the field value to the hysteretic requisite different from the non-hysteresis $H_{cT}$ which is the actual applied field value, via an introduced current flow in the windings. Concurrent with phase variation, the current flow is stopped by utilization of the same quantity of energy that was involved in the establishment of the current. The net effect being to retain $H_H$ and $H_L$ as the applied field extrema, while inducement to transition is provided by local and temporary establishment of $H_{sc}$ and $H_{sh}$. The work involved in the Meissner Effect being essentially that without hysteresis, heat losses are consequently controlled.

Figure 30:
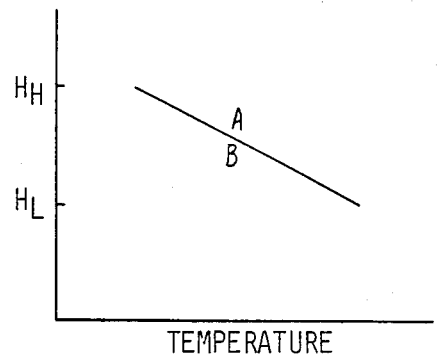
Figure 31:
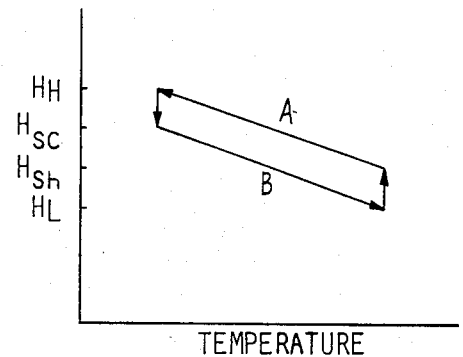

The relationship that hysteresis plays in affecting the expectancy of energy conversions is shown in FIGS. 30 and 31. FIG. 30 shows the cycle paths for a Segment the two field extrema. Line A indicates the normal phase, while Line B indicates the superconductive phase. Because there is no hysteresis here, Line A and Line B are superimposed. FIG. 31 shows what happens when hysteresis fields are involved at the field extrema. Note that Line A and Line B are no longer superimposed. The work output is now defined by the difference in field between $H_{sc}$ and $H_{sh}$. (Work is invested to raise the field from $H_L$ to $H_{sh}$, which offsets work output from fields $H_{sh}$ to $H_L$ along line B.) In order to reduce hysteresis effects, Line B must be coincident to Line A, which was the intention in the foregoing.

The nature of the hysteresis phenomena is expected to have the same result independent of contact with an external reservoir at the same temperature as the Segment, based upon the fact that hysteresis is expected at absolute zero (as well as finite temperatures) where no latent heat could exhibit. Thus, whether the transition process is adiabatic or isothermal, hysteresis expectancies should be the same.

It should be noted that quite often hysteresis is small. Indeed, it is very rare for hysteresis to ever achieve the theoretical maximum value, especially in the case of superheating, which at one time was considered unobservable by the scientific community. In any event, operation is expected even without steps taken to reduce hysteresis. Such steps, as outlined above, will, however, contribute to total energies conversion to work. Hence, all following envelopmental designs are necessarily subject to adoption of one or more of the above controls.

(E) Power and Speed Control

The motor produces a net unbalanced force defined as: $N_T(H_H^2/8\pi - H_L^2/8\pi) \cdot A$, where A is the cross-sectional area of the Transmogrification Point boundaries and N is the number of Transmogrific Periods. Force so developed will engender to accelerate the motional part of the motor as: $a = (F_M - F_C)/m$, where $F_M$ is the motor force, $F_C$ is the counter force which the motor does work against, and m is the mass of the motional (rotor) part of the motor. In rotational terms, a torque is developed by the motor which is defined by $F_M$ acting over a distance from the axis of rotation and designated as $T_M$. Similarly, the counter torque, $Y_C$, is derived from the force opposing motor rotation due to employments. The motor has a moment of inertia determined by its mass distribution from the axis of rotation, defined as I. Thus, the angular acceleration of the rotor is: $\alpha = (Y_M - Y_C)/I$. Speed of the rotor will be constant when $F_M = F_C$, or $Y_M = Y_C$. This may be done by adjusting $F_M$ (or $Y_M$) to suit the load by: adjusting the cyclic variables $T_1$ and $T_2$ such as to increase or decrease $H_1$ and $H_2$ and consequently the unbalanced motor force, or by using an integral magnetic brake external to the active portions of the motor subject herein.

In operation, speed regulation must be assured in order that abrupt load variation does not unfavorably affect the motor, such as causing the rotor velocity to exceed the maximum permitted for minimum Segment phase switch time. A servo-mechanism can be employed wherein the following exists: (1) an information gathering source for (a) rotor velocity relative to the stator, (b) motor torque, and (c) counter torque; (2) a source of desired steady state information generated by user selection regarding the elements in (1), above; (3) a comparator to compare deviations of user selected elements in (1), above, versus (2), above; and (4) a source for control over elements (a) and (b) in (1), above, to achieve the goals designated by the user under conditions externally manifest by (c) in (1), above, through utilization of information derived from the comparator.

(i) Information Gathering Source: This may be achieved by use of a magnetic or light pulse which registers as a designated number of Segments pass a location on the Stator.

(ii) Motor Torque: This is determined by the number of Transmogrific Periods that are currently active. (See equation above.)

(iii) Counter Torque: This may be determined from sampling the rate of angular acceleration of the rotor by a change in the number of tach pulses counted per unit time (defined in (i)).

(iv) User Defined Velocity and Torque: This is established by manually setting the frequency of an electronic oscillator to that which would register as pulse counts per second in (i), and by setting the number of active Transmogrific Periods.

(v) Comparator: This is a microprocessor which senses data from all the above, compares it, and is programmed to effect power and speed control, as detailed in Section (F).

The essential characteristic of operation is the 'Power Density' which is defined by the relative volume of working superconductor to motor volume, and the switch time for phase variation of the superconductor in use. Thus, the Power Density is defined as: $(V_{ST}/V_E) \cdot (H_H^2 - H_L^2)/8\pi)/t_c$, where $V_{ST}$ is the volume of the superconductive Segments collectively, $V_E$ is the total motor volume, inclusive, and $t_c$ is the phase transition relaxation time, factored for an entire process cycle (ie., $T_1$ to $T_2$ to $T_1$).

The switch time, t, is that period required for a Segment to achieve complete thermal and magnetic relaxation from transition to alternative phase and back again, and then return to original state variable coordinates (ie., the time for a complete cycle). Involved is the abiabatic nature of a portion thereof, and the HeaTraP. Actual switch times will depend on flux ejection time, as well as internal entropy relaxation, in addition to heat rates of energy input from external environs. A. B. Pippard, Progress in Low Temperature Physics VI (1955) page 172, hereby incorporated by reference, reports that, "Perhaps the most obvious possibility is that it requires an appreciable time simply to establish the state of order among the electrons which characterizes the superconducting phase, and equally to break down this order . . . Now high frequency experiments suggest that if t (here referring to the phase relaxation time) exists it is probably between $10^{-8}$–$10^{-11}$ seconds, in which case (the speed of phase propagation) is at least $10^4$ cm.sec$^{-1}$ in tin". This result strongly suggests that the switch time proposed in the above section on Output Expectancies is a conservative minimum ($t_c$ therein was assumed to be about $10^{-4}$ seconds).

(F) Heat Transfer Process (HeaTraP)

The 'HeaTraP' involves the means whereby heat is directed to the Segments from external environs.

The essential feature of the Coherent Magneto-Caloric Process deriving Thermosynthesis, demands that there be not only an electrical isolation between Segment constituents of the Envelopment, but that, also, there be thermal isolation as well. Mechanical construction and energy transfer combine to require solution of motor/generator Envelopment design.

The individual Segments must be independent from each other. There is, however, an attendant requirement that each be mechanically dependent to an output shaft (MS-MR), or at least in fixed proximity to the stator and each other (MS-MR and MS-ER). Hence, the most suitable engineering design is one utilizing rigid, structurally strong insulative spacing material between Segments. Thus, the Envelopment can be envisaged as a unit, mechanically (with provisos under the Three Dimensional Envelopment case, infra.). Any material may be used as an 'insulator' herein, where electromagnetic and structural needs are met, if the heat conduction across its dimension is small in the time needed for Segmental switch time, and in quantity compared to the evolved latent heats. The minimization of heat transfer sets lower bounds on the insulation cross-section between segments.

Heat flow ordinarily must be absent during the cooling adiabatic process, that is, adiabatics must be as close to perfect as possible during latents cooling process. This can be assured by utilizing a highly non-conductive insulative coating. To the extent a coating obtains, $T_2$ will not be achieved, but rather, some higher $T_{2h}$, where $T_2 < T_{2h}$, because the insulation will absorb some latents cooling depending on the area of contact, the heat capacity of the insulator, the average insulative material cyclic temperature, $T_i$, where $T_2 < T_i < T_1$, the time for segment relaxation, and the conductivity of the insulation, all factors impinging on energy transfer with the insulation specific heat (which should be as small as possible). $H_2$ will be consequently adjusted, as will the work output (which will decline). Now, the foregoing bespeaks the Magnetization Cycle. In the Demagnetization Cycle, adiabatics must obtain generally, but not critically, except as precise power output is required. That is, heat may enter from the external reservoir at any time. Indeed, heat entry during latents heating enhances thermal energies conversion to work. For an adiabatic heating latents process, $T_2'$ will obtain, but again, if the insulation effects to conduct away or absorb heat, $T_{2h} < T_2'$, and hence, work output diminishes, although such heats lost may be absorbed via cooling.

Heat flow must be present, as a net current from the high temperature reservoir into the Segment low temperature region, in order to fuel the Thermosynthetic process. The Magnetization Cycle can only admit this during latents heating and thereafter until Cycle conclusion, unless a Zeped is present, and then only to that extent. The Demagnetization Cycle can admit this both during latents heating and cooling processes. The requisites of such heat transfer processes are elaborated supra., in the section on Description of the Invention.

Ultimately, heat transfer must effect by means that will (a) permit Segmental mutual thermal and electrical isolation, (b) fast administration and distribution, and (c) control. The heat transfer process most advantageously suited is radiative. Thus, Segments are individually exposed to a radiative surface of high enough surface temperature to deliver necessary heats in coincidence with the relaxation time of the Segment. A maximum surface temperature is conveniently that ambient to the machine external environs. Exposure to the hot surface is controlled in the motor by simply situating it on the $T_2$ to $T_1$ side of the cycle in the Magnetization Cycle without a Zeped, or all about in the Demagnetization Cycle, or Magnetization Cycle with appreciable Zeped, but with due regard to energy exposure limits and retention of phase per the Tuyn Curve, in relaxation to $dH/dt$. As for the MS-ER, either the radiative surface can rotate about the Segments (without magnetic affect to itself, and supply necessary heat variation via its own linear temperature gradient) or thermal switches will be necessary to alternately admit or deny thermal contact between the radiative surface and the high temperature reservoir. In any case, control is attained via the servo system decribed supra.

For three dimensional Envelopments (described infra.), the problem is one to ensure even, immediate thermal contact, but attendantly ensure Segmental isolation and mechanical contiguity. For a radiative process, a situation must obtain wherein the Segments may each enjoy the individual attention of a radiative surface. This can be achieved by use of a series of radiative surfaces which are themselves interconnected, but not touching any Segment. Segments are connected via insulation material described supra., in two dimensions, but in the third dimension, they are not connected, but rather there is a spacing into which subsists the radiative surface. Clearly, because of the dimensions of each Segment great care is necessary to ensure spacing between surface and Segment if high superconductive densities are to be entertained. See FIGS. 43 and 44.

In the case of the Demagnetization Cycle, (or the Magnetization Cycle with appreciable Zeped) wherein some heat leak is at all times acceptable, it is possible to construct an Envelopment wherein: (a) there is no vacuum spacing, (b) there is electrical isolation of each Segment, and (c) there is direct contact by each Segment to a heat conductor (which is always hotter than the Segments so that no heat may flow out of a Segment and into another). This is attained by: (a) isolating each Segment via insulation both in terms of heat and electricity, (b) connecting at least one dimension (side) of each Segment to a heat (only) conductor which is always kept hotter than the Segments which it contacts, and (c) connecting the heat conductor to the high temperature heat reservoir via servo control. A nonelectrical conductor of heat will negate any Joule heating in its interior associated with $dH/dt$. The essentially constant rate of supplied heat would administer the output work over the entire Cycle. In order for the conductor not to influence the mutual isolation of the segments, it must not contact any Segments other than at the same applied magnetic field, otherwise Segments in fields of other value will sense the heat flow out of Segments at alternative temperatures. (This is similar to the situation in the bulk magneto-caloric process.) If this isolation is assured it is possible for the latent heat of $T_2$ to carry the Segment down and back to $T_1$. Unfortunately, the heat capacity of the conductor would have to be near vanishing for this to transpire, and further, to ensure non-interactive transition between Segments, each individual Segment should be connected to its own separate conductor. These problems are solved if the same heat less than the work output enters during $T_1$ to $T_2$ and the remainder of the heat (both heats equaling the work output) enters during $T_2$ to $T_1$, since always the conductor is hotter than any Segment. Cross-planer heat leak can be controlled by utilizing insulator between planes (ie., each Segment along the direction of the dH/dx). Heat entry at all times enhances the work in any event over the non-heat-entry $T_1$ to $T_2$ process cycle option. A minimum for Q during $T_2$ to $T_1$ would be only that amount resulting from the integral of the heat capacity over the temperature extrema for the conductor (and to a lesser degree the insulator).

Ultimately, the heat transfer must originate external to the machine, from a high temperature heat reservoir. Conveniently, this will be the ambient temperature in the environs of the machine (usually out-of-doors temperature on Earth's surface). This heat must channel into the machine structure without affecting the cryogenic integrity. Depending on heat flow necessary, simple static fins on a heat exchange surface, or liquid radiator heat exchange, may be used for heat extraction from the atmosphere. Utilization in water is expedited by the large heat exchange capability of a body of water.

The cryogenic stability of the low temperature assemblage must be assured through utilization of full insulation precaution against the heat conduit entering the machine and as against the external temperatures, generally. The transfer mechanism conduit may be a high heat conductivity metal or liquid circulating through piping. In any event, caution against radiative, conductive, and convective heat transfer to the low temperature components is essential via utilization of insulating materials and techniques common to the art of the science of cryogenics.

The rate of heat transfer is established by servomechanism (described supra.) and controlled via a heat valve by varying the surface contact area with the external temperature environment, or rate of liquid flow, or cross-sectional area of the conduits.

The external reservoir establishes the machine high temperature cycle external, via conduits described above. This energy is timed and quantized in transfer from the conduit to the Envelopmental Segment, with care taken to eliminate or minimize transfer to any other location, inclusive of Segment insulation.

Figure 32:
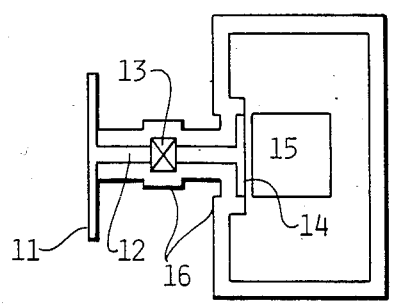
FIG. 32 is a schematic view of the HeaTraP.

The foregoing comments are summarized by FIG. 32. Heat absorber 11, takes heat from the external environment and this transfers down a heat transfer mechanism conduit 12. Heat may be blocked by heat valve, 13, operated by the servo-mechanism, which controls heat flow down the transfer conduit, 12, to the engine interior, where an internal radiator or conductor, 14, is situated permitting heat transfer to the envelopment, 15. 'Superinsulation' is used to control heat transfer and leakage, 16. The interior of the heat engine is evacuated.

1. The Magnetization Cycle

In this case, radiative transfer processes obtain due to necessities addressed supra. Heat transfer must commence at Transmogrification Point #2 (T.P. #2) where the temperature is $T_2$, and continue until $T_1$ is attained at T.P. #1. The amount of heat energy that must be delivered is $(H_H^2-H_L^2)/8\pi \cdot V_s$. Given a time, $t_{21}$, for processes from $T_2$ to $T_1$ to occur, a power is delivered to the Segment of $(H_H^2-H_L^2)/8\pi \cdot V_s/t_{21}$ in ergs. The engine power delivery is $(H_H^2-H_L^2)/8\pi \cdot V_s \cdot N_s/t_c$, where $N_s$ is the number of Segments cycling, and $t_c$ is the time for the execution of cycle of Transmogrific Period by the Envelopment, in ergs.

The Servo system monitors the various operative conditions as detailed supra. Essentially, per some load requirement, heat delivery to the Segments must always just engender $T_1$ out of $T_2$, with allowance for $LH_2$. In any event, the heat transfer is regulated by the surface area of the conductor/emitter and the temperatures of the surfaces of the conductor/emitter and Segment as, essentially $Q_t = \sigma \epsilon (T_o^4 - T^4)$, where $\sigma$ is defined as Stefan's constant, $\epsilon$ is the emissivity of the surface of the conductor per unit area, and $T_o$ is the operative temperature of the conductor/emitter surface which based upon the foregoing equation will supply the requisite heat to the Segment at temperature T in time $t_{21}$, to assure attainment of $T_1$. $T_o$ will be different for various values of applied field depending on dH/dx, which based upon dx/dt, affects the necessary dQ/dt to establish $T_1$ at $H_1$, while at all times retaining constant phase. Between T.P. #1 to T.P. #2 there is no heat transfer, so that $T_o$ is zero. This is arranged by the absence of the radiative conductor/emitter between $T_1$ to $T_2$, ie., during the evolution of $LH_1$, or by thermal masking via insulation. An average $T_o$ capable of supplying the requisite heat energy to attain $T_1$ in time $t_{21}$ can be used from T.P. #2 to T.P. #1, which simplifies maintenance and regulation provided the time rate of change of magnetic field is faster, per the Tuyn Curve.

(a) Regulation via Variance in Caloric Variables

Change in $T_1$ affects $T_2$ by altering $LH_1$, with consequent affect on $H_1$ and $H_2$, and hence, the work output. Thus, the energy delivery rate would change accordingly, and, therefore, $T_o$. If work out is less, then $T_o$ is less, while if the work out increases, then $T_o$ increases, so as to always deliver heat energy equivalent to the work in time $t_{21}$. Clearly, the highest $T_o$ can ever be is $T_e$, the external environment ambient temperature, while the lowest $T_o$ can be is $T_1$. Variation between these extremes can be accomplished by throttling the energy entry rate from the outside environs to the interior via servo-mechanism. Without new transfer $T_o$ must lower as heat radiates out to the lower temperature Segments. Clearly, operation can continue always provided $T_o > T_1$. If $T_o$ approaches $T_1$, then $t_{21}$ will increase, per the physics of radiative heat transfer. Hence, $t_{21}$ can be minimized by making $T_o >> T_1$.

In order to effect variation in $T_1$, the rate of energy transfer via conduits described above, is regulated as follows: (a) Reduction in $T_1$ is accomplished by allowing $T_o$ to decline due to radiative energies loss to the Segments during $T_2$ to $T_1$ exceeding heat energies conduction from the external reservoir. This has the effect to cause each succeeding cycle to end with a reduced $T_1$. For this to operate $H_1$ must increase to the critical value at the new $T_1$, and similarly $H_2$ must adjust to reflect the new critical value for the resultant $T_2$ (which is now lower than before). (b) Incrementation in $T_1$ is accomplished by permitting $T_o$ to increase due to an increase in heat conduction from the external environment over radiative heat loss to the Segments. As $T_o$ increases, radiative heat transfer increases to the Segments, and hence, the net heat absorbed by the Segments must increase over the previous cycle, resulting in a final higher temperature at the end of the Cycle, $T_1$. Thus, as $T_o$ increases, $T_1$ increases.

(b) Regulation via Magnetic Braking (Back EMF in the MS-ER)

In this technique, the heat transfer is regulated in such manner that always $T_o$ is present at the radiative surface. This means that $T_1$ and $T_2$ remain constants all during operation. Regulation of the shaft output work is obtained by channeling some of the potential useful work into waste heat (frictional, Joule heat, etc.) which in turn is either conserved and re-directed into the HeaTraP or rejected into the ambient external hot temperature heat reservoir. The net effect of which is to reduce the work output below its theoretical value per the field extrema, $H_H$ and $H_L$, and consequently the demand for new external heat transfer. Specifically:

$$(H_H^2 - H_L^2)/8\pi \cdot V_s - Q_w =$$

$$\left( \int_{T_2}^{T_1} C_s \cdot dT - LH_2 \right) \cdot V_s - Q_w,$$

where $Q_w$ is the waste heat.

In the final analysis, the time $t_{21}$ is defined by the duration for which the radiant energy at $T_o$ can heat the Segment from $T_2$ to $T_1$, with one side of the dimension $\xi^2$ in radiant contact. Applying the Stefan-Boltzmann Law: $Q_T = \sigma\epsilon(T_o^4 - T^4)$, and assuming black body conditions, and assuming $T_o$ is room temperature and T is about 2 Kelvins, the energy delivery to a 1 Segment thick layer of Segments of a collective one square centimeter in area is: $4.6 \times 10^5$ ergs, which corresponds to a frequency rate of about $3 \times 10^5$ cycles per second in tin.

2. The Demagnetization Cycle

Generally, the comments applicable to the Magnetization Cycle apply: certainly as to control processes and servo-mechanism. Unique aspects will be considered, only, following.

(a) HeaTraP only during $T_2$ to $T_1$

In this particular case heat entry into the Segment is during the latter half of the Cycle. The amount of heat necessary is defined by the work output, and is delivered in time $t_{21}$, which is the relaxation time from $T_2$ to $T_1$. For this specific case to be optimally successful, the rigors of radiative heating are preferred.

(b) HeaTraP during the entire Cycle

In this general case, heat enters the Segment during all parts (or some parts) of the Cycle. Heat may enter only during $T_1$ to $T_2$, wherein output work is a maximum. Heat may enter only during $T_2$ to $T_1$, wherein the description in (a), above, operates. Heat may enter at a constant level all during $T_1$ to $T_2$ to $T_1$. Whatever transpires, heat entry during $T_1$ to $T_2$ yields an incrementation in output work expectancy, since $T_2$ is higher, and, hence, $H_H - H_L$ is larger. The constraining factors were delineated in the section on the Description of the Invention. Note that if heat entry is permitted in the magnetization cycle between $T_1$ to $T_2$, it can only be to the extent of the Zeped energy so that the final $T_2$ is still absolute zero; to this extent, the Demagnetization description here has application for Magnetization.

Because heat may enter at any time, the need for isolation of Segments is affected. The use of a contacting heat conductor of thickness ranging around one-tenth $\xi(T)$ would mechanically link Segments of same applied field experience, but ones of differing applied field would be insulated thermally, thus preventing heat leakage across the Envelopmental assemblage in the direction of changing field. The heat conductor may be non-metallic so that Joule heat generation is absolutely minimum. These conductors would be independent, but linked to the external heat reservoir transfer system discussed above. The actual transfer can be by direct contact (assuming synchronous motion of components) or radiative, or via conductive liquid of very low viscosity (such as LHe II), or via highly heat conductive bearings.

Regulation and control would engender via servo-mechanism as described in the section on Magnetization. Clearly, this type of design bodes well under the actives of dissipitive processes such as Joule heating, friction, internal losses, and heat leak from the external reservoir. Thus, the servo-mechanism would register these operands, and regulate the heat transfer corresponding so that: if the work, W, has losses of $W_L$, there are heat leaks of $Q_L$, and internal losses of E, then $W - W_L = Q - Q_L - E$, where Q is the HeaTraP equal to $W - W_L$.

The section on Magnetization described the radiative solution to $t_{21}$, here is discussed the conductive solution. Generally, the expression for conductive energy transfer is: $Q_T = A\Delta T/(x/\kappa)$, where A is the facial cross-sectional area, $\Delta T$ the difference in temperature, x the thickness of the conductor, and $\kappa$ is the coefficient of thermal conductivity for the materials involved. Assuming a good conductor (non-metallic, metallic, or liquid) is used, the conductivity of the Segment itself would be a limiting factor of $t_{21}$, especially when the Segment is in the superconductive phase, wherein conductivity is a minimum.

It should be noted that in the operation of a Magnetization or Demagnetization Cycle, if a Zeped exists, energy to eliminate it must enter via the HeaTraP before latent cooling processes have terminated so that the Cycle may proceed in the usual way.

(G) Envelopmental Design

The Envelopment comprises the assemblage of Segments and their heat conductors (and insulators) forming a Thermosynthetically cyclable unit. Depending on construction, Envelopments possess varying degrees of geometric complexity. These will be detailed following.

(a) Zero Dimensioned Envelopment

This is essentially an Envelopment having but one coherently sized Segment; hence, no dimensions are preferably larger than $\xi(T)$. Radiative heat processes can easily act on such a construct, as can contactive heat transfer. Clearly, the Segment enjoys singular isolation in terms of ease of adiabatics. Change in magnetization can be reflected as (1) EMF in an external coil, or (2) mechanic relay transferring diamagnetic energies external. All foregoing comments on work and HeaTraP easily apply.

Figure 33:
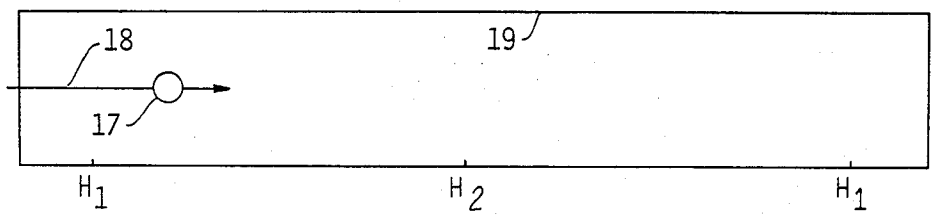
FIGS. 33 through 46 depict various Envelopment schemes for placement of relative components, HeaTraP, and EnTraP.

FIG. 33 represents the embodiment scheme where the Segment, 17, moves linearly to the right in a field varying from $H_1$ to $H_2$ to $H_1$, which is directed out of the paper. The Segment is connected to a preferably non-magnetic, insulated shaft, 18, which serves to transmit mechanical energy and conduct heat to the Segment (by periodic connection to a heat transfer conduit) as required. The cross-sectional diameter of the field is very large compared to ξ, so that no compression of the field occurs upon phase variation to the superconductive state. The field may be confined by a superconductive magnetic insulator shield, defining its boundary, 19.

Figure 34:
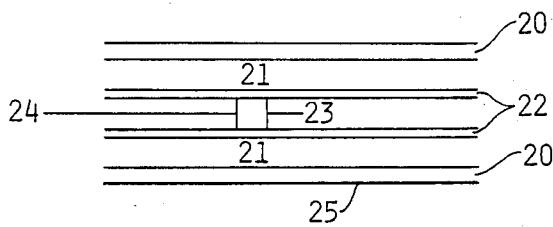
Figure 35:
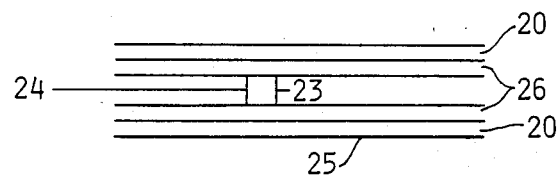
Figure 36:
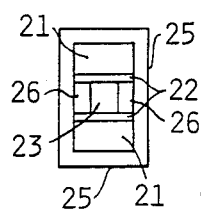

FIGS. 34, 35, and 36 show a series of views of a practical arrangement where the extent of the field is minimized. FIG. 34 is a side view, where the Segment, 23, connected by a non-magnetic insulator, 24, moves to the right in a field generated by solenoids, 21, varying from $H_1$ to $H_2$ to $H_1$. A permeable material or vacuum, 22, separates the Segment from the source of field, 21. Flux returns via a permeable Transmissor, 20. FIG. 35 is a top view now showing the alternative flux routing Transmissor, 26, of high permeability, as discussed in the section on Commutation. FIG. 36 is an end view. In all cases, the fields are delineated by superconductive diamagnetic shields, 25.

(b) One Dimensional Envelopment

In this case, the Envelopment consists of a collection of Segments in only one dimension. A line of ξ(T) dimensioned Segments results (the other dimensions remain zero dimensional). Again, radiative and conductive HeaTraP easily apply, as discussed afore. Work may be expressed as in (a), above. Caloric isolation is slightly more important here, since H may vary across the N·ξ(T), comprising the non-zero dimension, or, indeed, certain Segments may transition early. This is easily arranged by use of an insulator (electric and thermal) between each Segment.

Figure 37:
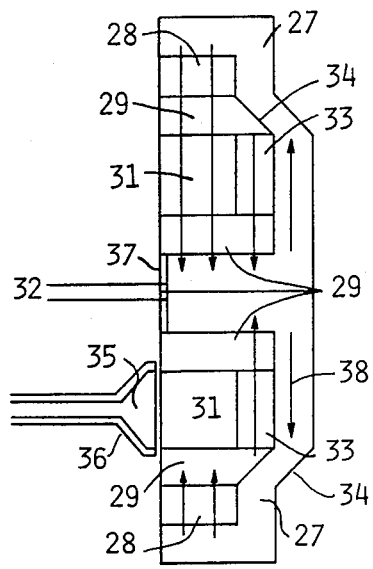
Figure 38:
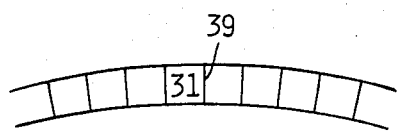
Figure 39:
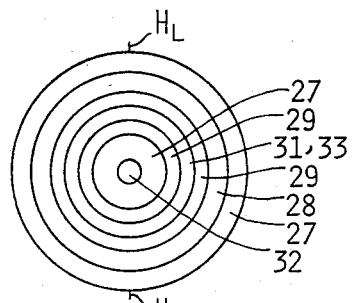

FIG. 37 is a side view of such an Envelopment with the upper section depicting a normal Segment, and the lower section depicting a superconductive Segment. The rotor is composed of the Segments, 31, connected to the output shaft, 32, by connecting links, 37; all other components are stationary. The engine is radially symmetrical about the axis of rotation, 32. Heating is supplied by a radiative heat transfer surface, 35, which is insulated, 36. on all sides but that facing the Segment. Arrangement shown for heating is for the Magnetization Cycle; for the Demagnetization Cycle, the radiative surface 35, is located at the upper section. Extent of location of the radiative surface, 35, is π radians from $H_2$ to $H_1$, shown here. Direction of the field flux is shown, 38, and is generally applicable to all Envelopmental designs. FIG. 38 depicts the radial placement of the Segments, which extends over 2π radians. Each are separated by an insulator, 39. FIG. 39 shows the radial symmetry of the motor via an end view, where $H_H$ and $H_L$ are the high and low field extrema, respectively. The one dimensional views show parts serving substantially the same functions as for the zero dimensional views. Specifically, unmentioned parts shown may be compared as follows: 20 to 27, 21 to 28, 22 to 29, 26 to 33, and 25 to 34.

(c) Two Dimensional Envelopment

Now there are N Segments in one axis and N' Segments in another axis. This creates a plane N×N' in area, but of thickness only ξ(T) (zero dimensional). Mutual isolation can be assured by separating each Segment via an insulator (thermal and electrical). HeaTraP can proceed from either radiative or conductive means, though because of complexity, conductive is preferred for the Demagnetization cycle. Work output is per the above comments.

Figure 40:
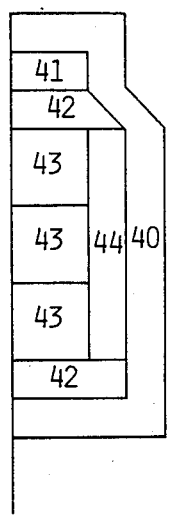
Figure 41:
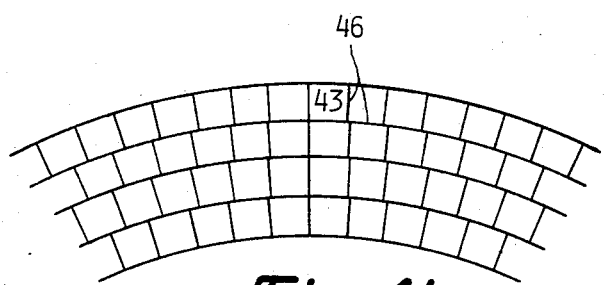
Figure 42:
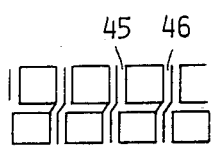

FIG. 40 shows a side view with essentially the same construction features of FIG. 37, inclusive of HeaTraP and EnTraP, although not shown here. The addition of Segments perpendicular to the axis of rotation will necessitate a commesurate increase in area for the radiative heating surface, 35. FIG. 41 depicts a portion of the Envelopment, showing relative Segment positioning, which would extend over 2π radians. FIG. 42 shows the means by which conductive heat transfer is accomplished. A preferably non-magnetic heat conductor, with minimal electrical conductivity, 46, connects all Segments of same instataneous applied field value exposure. The heat and electrical insulator, 45, effects separation of all Segments, 43, in the dH/dx direction. This alternative embodiment is most suited for the Enhanced Demagnetization Cycle. The two dimensional views show parts serving substantially the same functions as for the zero dimensional views. Specifically, unmentioned parts shown may be compared as follows: 20 to 40, 21 to 41, 22 to 42, and 26 to 44.

(d) Three Dimensional Envelopment

Now the Envelopment occupies a volume N×N'×N" in all three-dimensional axes. Clearly, with no ability to individually access Segments for radiative heat transfer, a problem evidences. This can be solved by attaching radiative conductor sheets to the stator and parallel to the field penetrating the Segments (when normal), in the direction of motion and extending for the duration such heating is required, depending on the cyclic mode (Magnetization or Demagnetization). Each segment is exposed to such a radiative surface, separated by thin vacuum spacing. Comments in (c), above, now apply. In the case of Demagnetization, with conductive heat transfer as a viable option, the Envelopment is rigidly solid with Segment-conductor-insulator-Segment sandwiching perpendicular to the disk of rotation, i.e., along the shaft rotation. Work out processes are the same as described above.

Figure 43:
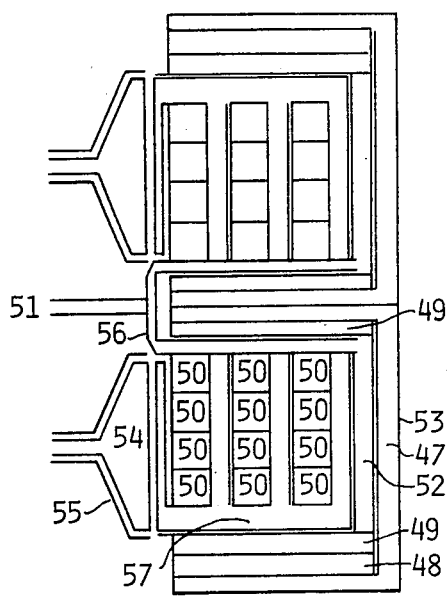
Figure 44:
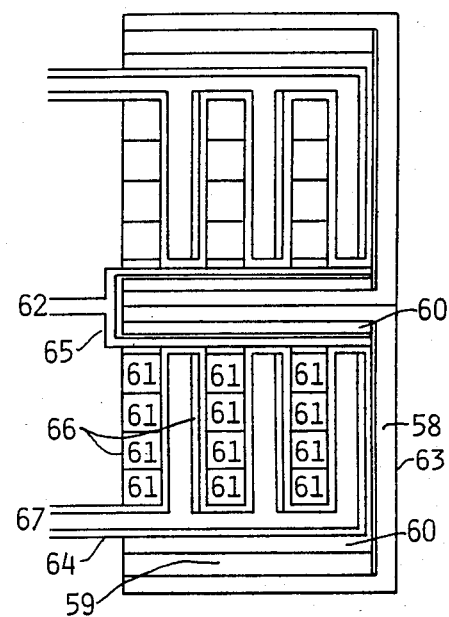
Figure 45:
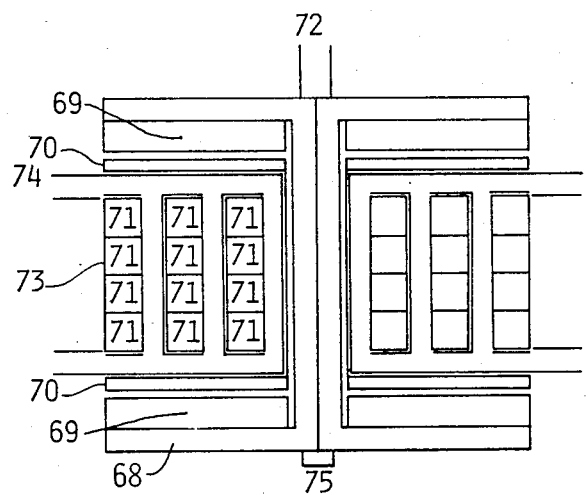

FIG. 43 depicts a Three Dimensional Envelopment with radiative heat transfer. Heat radiated from the stationary hot surface, 54, is accepted by a surface plate of heat conductor 57, which is preferably non-magnetic and an electrical insulator. Heat is conducted into interior surfaces opposite the Segments where conductive heat transfer accomplishes. Alternatively, radiative transfer may occur at these interior surfaces if a separation is established between them. Also, if the conductor, 57, is magnetic (that is, highly permeable) it may act in the capacity of a Transmissor of flux, 52. Parts are symmetrical about the shaft, 51. Vacuum separates parts in relative motion. In the conductive transfer mode, between the conductor, 57, and the Segments, 50, the Enhanced Demagnetization Cycle is preferred. Shown here the conductor is stationary relative to the Segments. FIG. 43 shows parts serving substantially the same functions as for the zero dimensional and one dimensional views. Specifically, unmentioned parts shown may be compared as follows: 20 to 47, 21 to 48, 22 to 49, 25 to 53, 36 to 55, and 37 to 56. FIG. 44 shows the three dimensional Envelopment designed to transfer external heat into the Segments via internal radiative heat surfaces, 67. Heat is transmitted from external environs conductively or via circulating liquids. Only one side of the radiative heating surfaces is opposite a Segment, the other being sheathed by insulator, 66, although both sides could be so exposed. Each Segment now enjoys an independent radiative HeaTraP, while each remains thermally and electrically isolated (by mutual separation via insulator material, 66). Radiative surfaces extend over 2π radians to permit an Enhanced Demagnetization Cycle, or Magnetization, or Demagnetization Cycle as desired, by adjusting the range of extent of the active radiative surface (i.e., at a temperature higher than the opposing Segment). Here there is relative motion between the Segments and the radiative conductor, 67. FIG. 44 shows parts serving substantially the same functions as for the zero dimensional and one dimensional views. Specifically, unmentioned parts shown may be compared as follows: 20 to 58, 21 to 59, 22 to 60, 23 to 61, 24 to 62, 25 to 63, 36 to 64, and 37 to 65. FIG. 45 depicts a Three Dimensioned Envelopment in which the Envelopment is stationary and the field circuit components are motional (i.e., forming the rotor). The external heat introduces, via a heat transfer conductor 74, and conducts heat onto the Segments although this could be via an internal radiative surfaces exchange if a small separation exists between the conductor 74, and the Segments, 71. As in all cases of Envelopment design, superconductive bearings are used, 75. At points where mutual component motion occurs, small vacuum separation is intended. As in FIG. 44, the heat conductor, 74, may be magnetic and consequently act as a Transmissor (part label 52 in FIG. 43), or else a Transmissor, 52, must be inserted as in FIG. 43. FIG. 45 shows parts serving substantially the same functions for the zero dimensional and one dimensional views. Specifically, unmentioned parts shown may be compared as follows: 20 to 68, 21 to 69, 22 to 70, 24 to 72, and 39 to 73.

The essential feature is to preserve the isolation of the zero-dimensional case, with the high density of the three dimensional case.

H. Energy Transfer Process (EnTraP)

The EnTraP involves the means whereby work is delivered external to the motor for useful employment. Generally, this is accomplished via a connective shaft attached to the axis of rotation of the rotor. Magnetic bearings employing superconductors may be utilized, together with magnetic clutches and insulative materials, as a means to affix and bring out the shaft to room temperature (or other) environs, with minimum losses.

II. Magnetic Striction-Electrical Relaxation:

Generator Embodiment

All comments in the MS-MR section, above, apply here, except as noted.

(A) Magnetic Circuit

The field magnets can vary both linearly (as in the motor), in which case the Segments must move relatively, or in time, in which case relative motion is obviated. The source of dH/dt emanates from a time varying electric current in the superconductive windings of the field solenoids, for the latter case.

(B) Stator

See comments in the MS-MR.

(C) Rotor

This component may be obviated when there is present a time varying magnetic field, dH/dt, in which event the engine is composed of a singular stator consisting of both field magnets, with associated circuiting, and Envelopment.

(D) Commutation

When dH/dt is employed as the means to vary the field, all the Envelopment may undergo phase variation simultaneously (or in any portion thereof). In such event, the Transmissor would accept the field excluded from the Segments, while attendantly, dI/dt, the time varying induced current in the winding, is output to an external circuit, in amount defined by the energy of the excluded field, and is an output when transition is normal to superconductive, and an input (from the external circuit) when transition is superconductive to normal phase.

(E) Power and Speed Control

The generator produces a net electromotive energy defined as $(\Phi_H^2 - \Phi_L^2)/2 \cdot l/\mu A - (\Phi_H^2 - \Phi_L^2)/2 \cdot l/\mu A_T$, where $\Phi_H$ is the flux at $H_H$ and $\Phi_L$ is the flux at $H_L$, and l is the length of the working space (which is defined by the Envelopmental dimension), A its cross-section, $A_T$ the cross-section of the Transmissor (in terms of vacuum permeability), and $\mu$ its permeability (in terms of vacuum), and where the former term designates energy supplied from the external circuit and the latter term designates energy supplied to the external circuit. At the Transmogrification Point, the Transmissor is present, and included in A along with the Segments cross-section.

Control is attained utilizing variation of the Thermosynthetic variables, $T_1$ and $T_2$, and/or feedback of some portion of the output electrical energies into a resistive load and back into the HeaTraP.

(F) Heat Transfer Process (HeaTraP)

See the section on MS-MR, above.

(G) Envelopmental Design

See the section on MS-MR, above.

(H) Energy Transfer Process (EnTraP)

Essentially, there are two means to derive electrical energies output from the Coherent Phase Transition: (a) cause a time rate of change of magnetic flux in the seat of magnetomotive force (MMF), there being only a stator component, and (b) cause a time rate of change of magnetic flux to be regionally encountered by a Segment because of a net motion of the subject Segment relative to the seat of MMF. In either case, the Segment experiences a changing magnetic field, with Faraday induced electromotive force consequences, and with no net work input to achieve the magnetic field variations, inclusive of relative motions.

Characteristic of any employment is a magnetic circuit capable of admitting a time rate of change in magnetic flux, when appropriate. See J. App. Phy. 33, 875 (1962), hereby incorporated by reference.

EMF is registered and picked-up from the seat of MMF. In this scheme, the field magnet undergoes field intensity variation, the presence or absence of the superconductive phase thereby affecting the field energy, with attendant consequence on energy needed to generate and degenerate the field. As a variant, a pick-up coil can wrap the Segments, Transmissor, or both collectively, which schemes being adaptable for means (a) and (b), above.

Figure 46:
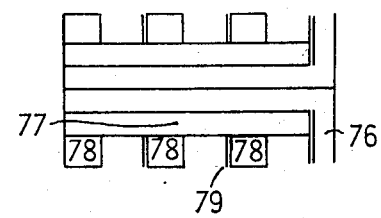

FIG. 46 depicts the magnetic circuit design for the three dimensional Envelopment of FIG. 43 where the mechanical EnTrap is removed. Tight coils are wound around the Segments, or else the windings in the seat of MMF, 48, itself register the net output EMF (as per location shown in FIG. 43). Note that parts shown serve the same function as parts labeled in FIGS. 43 and 44. Specifically, parts may be compared as follows: 47 to 76, 49 to 77, 50 to 78, and 66 to 79.

III. Heat Mover Embodiment

The Cycle may also be employed as a means to direct heat flow from one location to another. A practical embodiment is one wherein the Cycle is employed to engender heating or cooling of a region of space. Local heating will result when the work output from the cycle, per the preceding embodiments, is converted into heat in the subject region, while such energies derive from the external reservoir heat. Local cooling will result when the work output from the Cycle, per the preceding embodiments, is derived from the heat energies of the subject region, and said work is rejected as heat to the external reservoir.

Figure 47:
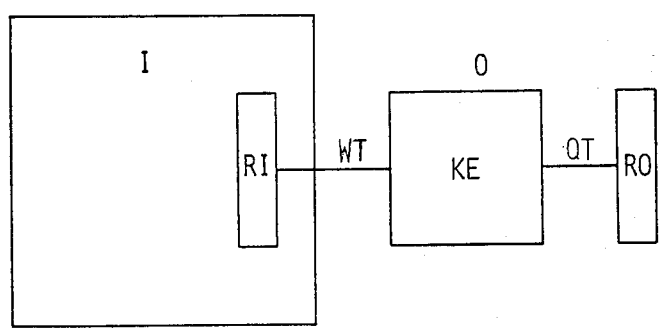
FIG. 47 is a schematic view of a heat mover embodiment.

FIG. 47 schematically represents the foregoing heating and refrigerating processes, where O represents the external reservoir, I represents the local region of space, KE represents the engine proper, Ri represents the heating unit, either resistive or frictional in nature depending on whether the engine embodiment is of generator or motor form respectively, RO represents the heat collector, and QT and WT represent respectively transfer routes for heat flow into the engine and work flow out of the engine. Shown is a heating process in the locality. Refrigeration occurs when RO and RI reverse locations, along with WT and QT.

IV. Start-up and Operation

In any embodiment configuration, the Cycle will adduce once three criteria are affirmatively established: (1) requisite temperature and field values for desired Segment phase, per the Tuyn Curve, (2) adiabatic isolation of the Segments, and (3) timing of the variation in temperature and field, per (1), to conform to subject superconductor relaxation times.

Clearly, the simplest means to attain the requisite low temperature region is to cool the Envelopment via use of cryogenic refrigerant. Once this is attained, the following procedure will effect operation.

In the case of a moving rotor relative to the stator embodiment (MS-MR or MS-ER), it is clear that, given a finite relaxation time for the complete cycle processing, the very slow initial angular velocity of the rotor, and the fact that dH/dt must be faster than dT/dt per the Tuyn Curve, as elaborated above, if the locations of the Transmogrification Points are to remain constant, the linear distance for varying the field from $H_L$ to $H_H$ and $H_H$ to $H_L$ must be commesurately compressed below the optimum angular velocity magnetic field variation distance, which is the distance between the fixed Transmogrification Points. From the foregoing it is seen that by compressing the field variation distance any slow angular speed can be entertained, while the maximum angular speed of rotation is given by the Transmogrification Point separation and the time to conclude a cycle due to relaxation processes. That is: $\omega_o = S_P/t_p \div r$ where $\omega_o$ is the optimum angular velocity, $S_p$ is the particular linear distance between Transmogrification Points, $t_p$ is the respective particular process cycle minimum switch time (magnetization, demagnetization, and/or heating processes), and r is the distance of the Segment from the axis of rotation. It is obvious, therefore, that for angular velocities less than $\omega_o$, $S_p$ should shorten; however, it is a fixed value. Thus, some of the angular distance is noncontributive to work output. But this can be remedied by utilizing more Transmogrific Periods, thus, increasing torque and, accordingly, work. (But then with more such Transmogrific Periods, per $2\pi$ radians revolution, $\omega_o$ is smaller than for the singular Transmogrific Period case where, admittedly, torque is least.) Note that the time to complete one cycle is, $t_c = t_{p1} + t_{p2}$ where the former relates to processes during T.P. #1 to T.P. #2 and the latter to processes during T.P. #2 to T.P. #1. Also, distances between Transmogrification Points uniquely depend upon the type of included processes (magnetization, demagnetization and/or heating), so that the total distance of cycle is, $S_c = S_{p1} + S_{p2}$. Note also that Envelopments of dimensions with non-zero radial (out from the axis of rotation) values, the $\omega_o$ is that for the layer of Segments with smallest r. When the $\omega_o$ of larger r value Segments permits, they could be subjected to an incremented number of Transmogrific Periods in order to maximize the energy contribution of each Segment.

Figure 48:
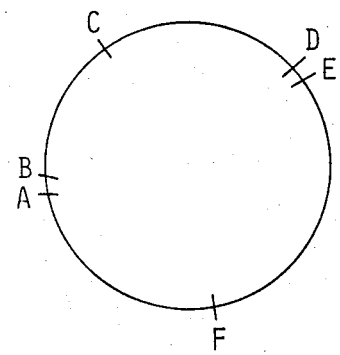
FIG. 48 is a diagram relating engine parameters at start up.

To start such an embodiment, the superconductive phase for the Magnetization cycle, or the normal phase for the Demagnetization Cycle, is established for all Segments. Temperature is established as $T_1$ via cryogenic refrigerant, which is then removed from contact. The field is switched on with $H_1$ applied at Transmogrification Point #1 and $H_2$ applied at Transmogrification Point #2. The field spatially varies from $H_1$ to $H_2$ at T.P. #1 and from $H_2$ to $H_1$ at T.P. #2, that is $\Delta H/\Delta x = (H_H - H_L)/S_p$, where $S_p$ is given by the relation, $S_p = \omega_r t_p \cdot r$, and where $S_p$ and $t_p$ have subscripts p1 or p2 as defined above. As the angular velocity of the rotor increases to $\omega_o$, $S_p$ becomes the distance between the fixed Transmogrification Points. One means to effect this spatial variation in the linear extension of the magnetic field is through the use of a source of magnetic field which is composed of many component units along the rotational direction, the activation of a portion of which accomplishes the desired result. (It should be noted that this variability in spatial variation in the field is usable in operation when speed is regulated by means of variation in the caloric variables, as detailed supra.) However, it is simplest to minimize the spatial variation distance for the field to a fixed value occassioned upon the magnetic relaxation time, and to retain this spacing even as the angular velocity admits of incremented spacing. Refer to FIG. 48. Points A and D represent the location of the fixed Transmogrification Points when is operative, T.P. #1 and T.P. #2, respectively. $H_1$ and $H_2$ are the magnetic fields at points A and D respectively. When the angular velocity is less than $\omega_o$, the caloric relaxation process will terminate at a location before the next fixed Transmogrification Point. This is represented by points C and F, where rotation is taken to be clockwise. This circumstance can be anticipated by use of the following technique: (1) The magnetic field is varied abruptly (but limited to less than the flux ejection time, or magnetization change time) just after the fixed Transmogrification Points, A and D. This is represented by Points B and E, respectively. The value of the field is kept constant between Points B-D and E-A, that is, field varies only between Points A-B and D-E. (2) The value of the fields at Points B and E are determined to just retain the Segmental phase at Points C and F, respectively. That means, for instance, for a Magnetization Cycle, the field would be $H_1$ at Point A, $H_2 - dH$ at Points B-D, and $H_2$ at Point D. There is, therefore, an infinitisimal adjustment in field at Points D and A to secure phase variation. (The fields would be $H_2$ at D, $H_1 + dH$ at Points E-A, and $H_1$ at A.) For a Demagnetization Cycle, the signs for the incremental fields, dH, reverse. The result of the foregoing is that: (1) The magnetic field agencies are fixed in position, (2) Field varies between Points A-B and D-E, although slight adjustment occurs at Points A and D, (3) Caloric relaxation occurs between Points A-C and D-F (but substantively between Points B-C and E-F), (4) Phase variation always occurs at the Transmogrific Points, A and D, and (5) Between Points C-D and F-A the Cycle is inert. Note that at $\omega_o$, Points C and D merge and Points F and A merge. In any event, it will be necessary to adjust the rate of heat flow entry as the angular velocity varies. The minimal operational angular velocity is one which would cause a merger of Points B and C and Points E and F, which should be supplied at the start of cycle (a start-up angular velocity maximizing B-C, E-F should be contemplated, since A-B and D-E are defined by $\omega_o$).

In the case of a stationary orientation between the Envelopment and magnetic field sources (MS-ER), no angular (or linear) velocity variation, with impact upon relaxation times, evidences. Thus, all that is required is to establish phase and temperature as outlined above, then introduce a time varying magnetic field upon the sources of MMF, for which, upon attainment of $H_1$, processing commences.

What is claimed is:

1. A method for producing work from a superconductive heat engine having field control means for applying a magnetic field and heat reservoir means for supplying fuel for said heat engine, comprising the steps of:

providing at least one thermally and electrically substantially isolated segment made from a superconductive material having $100\xi(T)$ greater than $\sqrt{5\lambda(T)}$ and having a size between $100\xi(T)$ and $\sqrt{5\lambda(T)}$, which will achieve a magneto-caloric effect phase transition affecting substantially the entire volume of said segment in which a mixture of phase state is substantially absent during said phase transition, where $\xi(T)$ is defined as the temperature dependent range of coherence of the superconductive electrons and $\lambda(T)$ is defined as the temperature dependent depth of penetration into the superconductor by a magnetic field, and where a magneto-caloric effect is defined as a superconductive phase variation process in which latent heat evolution is capable of varying the temperature of the superconductor;

cycling said segment between a superconductive phase and a normal phase by varying the applied magnetic field relative to said segment in a predetermined relationship with a change in the temperature of said segment and selectively supplying heat from said heat reservoir means in cooperation with a magneto-caloric effect, said work being produced by the relative change in the applied magnetic field during said superconductive phase.

2. The method according to claim 1, wherein said magneto-caloric effect causes said segment to self cool, at least in part, in response to a transition from said superconductive phase to said normal phase, whereby a latent heat of cooling is operable to decrease the temperature of said segment.

3. The method according to claim 2, wherein said magneto-caloric effect causes said segment to self heat, at least in part, in response to a transition from said normal phase to said superconductive phase, whereby a latent heat of heating is operable to increase the temperature of said segment.

4. The method according to claim 3, wherein said heat from said heat reservoir means causes the temperature of said segment to increase to a transmogrification point in said cycling step where said segment is switched from one of said phases to the other.

5. The method according to claim 4, wherein the magnitude of said magnetic field is varied relative to said segment at a rate such that a phase change is retained until a transmogrification point in said cycling is reached.

6. The method according to claim 5, wherein a plurality of said segments are provided to form an envelopment in which each of said segments are generally electrically and thermally isolated from each other, and mechanically associated with each other.

7. The method according to claim 6, wherein said size of said segments in said envelopment is such that the cross-sectional diameter for each of said segments is generally less than the range of coherence and at least five times the penetration depth of said applied magnetic field, and a substantial portion of the bulk volume caloric and magnetic properties of said segments continue to function.

8. The method according to claim 7, wherein said segments are selected from the group consisting of superconductors having the characteristics of Type I superconductors.

9. The method according to claim 8, wherein said heat engine produces mechanical work from the heat supplied by said heat reservoir means.

10. The method according to claim 8, wherein said heat engine produces electrical work from the heat supplied by said heat reservoir means.

11. A method for producing work from a superconductive heat engine having field control means for applying a magnetic field and heat reservoir source means for supplying fuel for said heat engine, comprising the steps of:

providing at least one thermally and electrically substantially isolated segment made from a superconductive material having $100\ \xi(T)$ greater than $\sqrt{5\lambda(T)}$ and of a size between $100\ \xi(T)$ and $\sqrt{5\lambda(T)}$ which will achieve a magneto-caloric effect phase transition affecting substantially the entire volume of said segment in which a mixture of phase state is substantially absent during said phase transition, where $\xi(T)$ is defined as the temperature dependent range of coherence of the superconductive electrons and $\lambda(T)$ is defined as the temperature dependent depth of penetration into the superconductor by a magnetic field, and where a magneto-caloric effect is defined as a superconductive phase variation process in which latent heat evolution is capable of varying the temperature of the superconductor;

providing an initial state in which said segment is in a superconductive phase at a temperature between absolute zero and the critical temperature of said segment in zero magnetic field;

increasing the applied magnetic field relative to said segment beyond a first transmogrification point, where said segment undergoes a transition from said superconductive phase to a normal phase at a rate sufficient to retain said normal phase of said segment with respect to a decrease in the temperature of said segment;

allowing said segment to self cool under a magneto-caloric effect in response to said transition from said superconductive phase to said normal phase, whereby a latent heat of cooling is operable to decrease the temperature of said segment;

decreasing the applied magnetic field relative to said segment beyond a second transmogrification point, where said segment undergoes a transition from said normal phase to said superconductive phase at a rate sufficient to retain said superconductive phase of said segment with respect to an increase in the temperature of said segment;

allowing said segment to self heat under said magneto-caloric effect in response to said transition from said normal phase to said superconductive phase when said transition occurs at a temperature above absolute zero, whereby a latent heat of heating is operable to increase the temperature of said segment; and permitting heat flow from said heat reservoir means to said segment for further increasing the temperature of said segment until said segment is returned to said initial state, said work being produced by the relative change in the applied magnetic field during said superconductive phase.

12. The method according to claim 11, wherein said steps of increasing the magnetic field and allowing said segment to self cool occur concomitantly.

13. The method according to claim 12, wherein said steps of decreasing the magnetic field and allowing said segment to self heat occur concomitantly.

14. The method according to claim 13, wherein said step of permitting heat flow occurs after said step of allowing said segment to self heat, and said step of decreasing the magnetic field continues concommitantly with said step of permitting heat flow.

15. The method according to claim 14, wherein said step of increasing the magnetic field increases the applied magnetic field relative to said segment to a predetermined magnitude generally associated with said second transmogrification point.

16. The method according to claim 1, wherein said steps of increasing the magnetic field, allowing said segment to self cool, decreasing the magnetic field, allowing said segment to self heat, and permitting heat flow form a magnetization cycle which is repeated at a predetermined rate.

17. The method according to claim 16, wherein a plurality of said segments are provided to form an envelopment in which each of said segments are generally electrically and thermally isolated from each other, and mechanically associated with each other.

18. The method according to claim 17, wherein said size of said segments in said envelopment is such that the cross-sectional diameter for each of said segments is generally less than the range of coherence and at least five times the penetration depth of said applied magnetic field, and a substantial portion of the bulk volume caloric and magnetic properties of said segments continue to function.

19. The method according to claim 18, wherein said segments are selected from the group consisting of superconductors having the characteristics of Type I superconductors.

20. The method according to claim 19, wherein said heat engine produces mechanical work from the heat supplied by said heat reservoir means.

21. The method according to claim 19, wherein said heat engine produces electrical work from the heat supplied by said heat reservoir means.

22. A method for producing work from a superconductive heat engine having field control for applying a magnetic field and heat reservoir means for supplying fuel for said heat engine, comprising the steps of:

providing at least one thermally and electrically substantially isolated segment made from a superconductive material having $100\xi(T)$ greater than $\sqrt{5}\lambda(T)$ and of a size between $100\xi(T)$ and $\sqrt{5}\lambda(T)$ which will achieve a magneto-caloric effect phase transition affecting substantially the entire volume of said segment in which a mixture of phase state is substantially absent during said phase transition, where $\xi(T)$ is defined as the temperature dependent range of coherence of the superconductive electrons and $\lambda(T)$ is defined as the temperature dependent depth of penetration into the superconductor by a magnetic field, and where a magneto-caloric effect is defined as a superconductive phase variation process in which latent heat evolution is capable of varying the temperature of the superconductor;

providing an initial state in which said segment is in a normal phase at a temperature between absolute zero and the critical temperature of said segment when in zero magnetic field;

decreasing the applied magnetic field relative to said segment beyond a first transmogrification point, where said segment undergoes a transition from said normal phase to a superconductive phase at a rate sufficient to retain said superconductive phase of said segment with respect to an increase in the temperature of said segment;

allowing said segment to self heat under a magneto-caloric effect in response to said transition from said normal phase to said superconductive phase, whereby a latent heat of heating is operable to increase the temperature of said segment;

increasing the applied magnetic field relative to said segment beyond a second transmogrification point, where said segment undergoes a transition from said superconductive phase to said normal phase at a rate sufficient to retain said normal phase of said segment with respect to a decrease in the temperature of said segment;

allowing said segment to self cool under said magneto-caloric effect in response to said transition from said superconductive phase to said normal phase, whereby a latent heat of cooling is operable to decrease the temperature of said segment; and permitting heat flow from said heat reservoir means to said segment for increasing the temperature of said segment until said segment is returned to said initial state, said work being produced by the relative change in the applied magnetic field during said superconductive phase.

23. The method according to claim 22, wherein said steps of increasing the magnetic field and allowing said segment to self cool occur concomitantly.

24. The method according to claim 23, wherein said steps of decreasing the magnetic field and allowing said segment to self heat occur concomitantly.

25. The method according to claim 24, wherein said step of permitting heat flow occurs after said step of allowing said segment to self cool, and said step of increasing the magnetic field continues concomitantly with said step of permitting heat flow.

26. The method according to claim 25, wherein said step of increasing the magnetic field increases the applied magnetic field relative to said segment to a predetermined magnitude genrally associated with said first transmogrification point.

27. The method according to claim 2, wherein said steps of decreasing the magnetic field, allowing said segment to self heat, increasing the magnetic field, allowing said segment to self cool, and permitting heat flow form a demagnetization cycle which is repeated at a predetermined rate.

28. The method according to claim 27, wherein a plurality of said segments are provided to form an envelopment in which each of said segments are generally electrically and thermally isolated from each other, and mechanically associated with each other.

29. The method according to claim 28, wherein said size of said segments in said envelopment is such that the cross-sectional diameter for each of said segments is generally less than the range of coherence and at least five times the penetration depth of said applied magnetic field, and a substantial portion of the bulk volume caloric and magnetic properties of said segments continue to function.

30. The method according to claim 29, wherein said segments are selected from the group consisting of superconductors having the characteristics of Type I superconductors.

31. The method according to claim 30, wherein said heat engine produces mechanical work from the heat supplied by said heat reservoir means.

32. The method according to claim 30, wherein said heat engine produces electrical work from the heat supplied by said heat reservoir means.

33. The method according to claim 22, wherein said step of permitting heat flow from said heat reservoir means to said segments for increasing the thermal energy of said segments occurs, at least in part, before said latent heat of cooling, and which thereby contributes at least part of said thermal energies required to return said segment to said initial state upon conclusion of said evolution of latent heat of cooling.

34. A superconductive heat engine for producing work, comprising:
at least one thermally and electrically substantially isolated segment made from a superconductive material having $100\xi(T)$ greater than $\sqrt{5}\lambda(T)$ and of a size between $100\xi(T)$ and $\sqrt{5}\lambda(T)$ which will achieve a magneto-caloric effect phase transition affecting substantially the entire volume of said segment in which a mixture of phase state is substantially absent during said phase transition, where $\xi(T)$ is defined as the temperature dependent range of coherence of the superconductive electrons and $\lambda(T)$ is defined as the temperature dependent depth of penetration into the superconductor by a magnetic field, and where a magneto-caloric effect is defined as a superconductive phase variation process in which latent heat evolution is capable of varying the temperature of the superconductor;
means for providing a predetermined cryogenic environment for said segment;
means for applying a magnetic field to said segment;
means for varying the magnitude of said magnetic field relative to said segment in a predetermined relationship with a variation in temperature of said segment such that said segment may be cycled between a superconductive phase and a normal phase in response to the magnitude of said magnetic field;
means for selectively supplying heat to said segment in cooperation with a magneto-caloric effect to cause a variation in the temperature of said segment.

35. The superconductive heat engine according to claim 34, wherein said means for varying the magnitude of said magnetic field varies the magnitude of said magnetic field at a rate such that a phase change is retained until a transmogrification point in said cycling is reached.

36. The superconductive heat engine according to claim 35, wherein a plurality of said segments are provided to form an envelopment in which each of said segments are generally electrically and thermally isolated from each other, and mechanically associated with each other.

37. The superconductive heat engine according to claim 36, wherein said means for applying a magnetic field applies a magnetic field in which at least one portion of said segments in said envelopment are subjected to one magnetic field magnitude and another portion of said segments are subjected to another magnetic field magnitude.

38. The superconductive heat engine according to claim 37, wherein said size of said segments in said envelopment is such that the cross-sectional diameter for each of said segments is generally less than the range of coherence and at least five times the penetration depth of said applied magnetic field, and a substantial portion of the bulk volume caloric and magnetic properties of said segments continue to function.

39. The superconductive heat engine according to claim 38, wherein a magnetically permeable insulator of heat and electricity is interposed between each of said segments in said envelopment.

40. The superconductive heat engine according to claim 39, wherein said segments in said envelopment are aligned in a three dimensional array.

41. The superconductive heat engine according to claim 40, wherein said segments are disposed radially about an axis of rotation.

42. The superconductive heat engine according to claim 39, wherein said envelopment includes transmissor means for accepting the magnetic flux expelled from said segments when said segments undergo a transition from said normal phase to said superconductive phase.

43. The superconductive heat engine according to claim 42, wherein said envelopment includes a diamagnetic shield means for confining the magnetic flux generated by said means for applying a magnetic field.

44. The superconductive heat engine according to claim 38, wherein said means for selectively supplying heat includes a heat reservoir and at least one heat transfer surface which is operable to selectively transfer heat from said heat reservoir means to said segments in said envelopment.

45. The superconductive heat engine according to claim 3, wherein said heat reservoir is a source of ambient heat.

46. The superconductive heat engine according to claim 4, wherein said means for varying the magnitude of said magnetic field includes translation means for providing relative movement between said segments and said applied magnetic field, such that said segments are subjected to a magnetic field of a varying magnitude with position.

47. The superconductive heat engine according to claim 46, wherein said translation means provides linear movement of said segments relative to said applied magnetic field.

48. The superconductive heat engine according to claim 46, wherein said translation means provides rotational movement of said segments relative to said applied magnetic field.

49. The superconductive heat engine according to claim 46, wherein said means for applying a magnetic field includes at least one solenoid.

50. The superconductive heat engine according to claim 46, wherein said heat engine includes an output shaft connected to said envelopment for transmitting the work developed by said relative movement between said segments and said applied magnetic field.

51. The superconductive heat engine according to claim 46, wherein each of said segments are spherical in shape.

52. The superconductive heat engine according to claim 51, wherein said segments are selected from the group consisting of superconductors having the characteristics of Type I superconductors.

* * * * *